United States Patent [19]
Kifuku et al.

[11] Patent Number: 5,740,040
[45] Date of Patent: Apr. 14, 1998

[54] ELECTRIC POWER STEERING APPARATUS WITH ENHANCED ROAD FEEL

[75] Inventors: Takayuki Kifuku; Shunichi Wada, both of Tokyo, Japan

[73] Assignee: Mitsubishi Denki Kabushiki Kaisha, Tokyo, Japan

[21] Appl. No.: 563,585

[22] Filed: Nov. 28, 1995

[30] Foreign Application Priority Data

Dec. 21, 1994 [JP] Japan ............................ 6-318350

[51] Int. Cl.⁶ .......................... B62D 5/04; B62D 153/00
[52] U.S. Cl. .................... 364/424.051; 180/446; 388/811; 318/599
[58] Field of Search .............. 364/424.051; 180/443, 180/446; 388/811, 815, 819; 318/599

[56] References Cited

U.S. PATENT DOCUMENTS 5,076,381  12/1991  Daido et al. ...................... 180/446

FOREIGN PATENT DOCUMENTS 195 10 394  9/1995  Germany.
3-176272  7/1991  Japan.
4-8190  1/1992  Japan.

OTHER PUBLICATIONS

Patent Abstracts of Japan, No. 157 (M-1236) JP4008666 "Electric Power Steering Device".

*Primary Examiner*—Michael Zanelli
*Attorney, Agent, or Firm*—Sughrue, Mion, Zinn, Macpeak & Seas, PLLC

[57] ABSTRACT

An electrically-operated steering apparatus in which in addition to avoiding an increase in cost caused by installing a new sensor or using a high process speed CPU, steering feels, such as steering wheel return, viscous feeling, inertial feeling and frictional feeling, are improved. In addition to assisting a static steering torque on the basis of a torque sensor, with a motor-applied voltage detection circuit capable of removing the square wave component attendant on the PWM drive of a motor, a motor angular velocity ω is estimated from the output data of the relevant circuit. A motor angular acceleration dω/dt is estimated from the motor angular velocity ω by using a differential calculator. The steering friction and the moment of inertia are compensated on the basis of the motor angular velocity ω and motor angular acceleration dω/dt, respectively.

17 Claims, 23 Drawing Sheets

(1) AT LOW SPEED STEERING (2) AT HIGH SPEED STEERING 5,740,040

ELECTRIC POWER STEERING APPARATUS WITH ENHANCED ROAD FEEL

BACKGROUND OF THE INVENTION

1. Field of the Invention

The present invention relates to a power steering wherein steering assisting torque is generated by a motor.

2. Description of the Related Art

Conventionally, an electrically-operated power steering system is provided with a torque sensor for the steering torque of a steering system and a vehicle speed sensor for detecting vehicle speed, to control the assist torque for a motor coupled to the steering system on the basis of the output data of these sensors. Recently, to improve steering feel a method for compensating the inertia, viscosity or the like of a steering system on the basis of the angular velocity or angular acceleration of a motor has been proposed in addition to controlling the assist torque of a motor.

Generally, for controlling a steering system on the basis of the angular velocity or angular acceleration of a motor as mentioned above, a sensor for detecting the angle or angular velocity of a motor is provided. However, it is no preferable to provide another sensor because of the resulting cost increases. Then, a method for obtaining an angular-velocity signal by estimating the induced voltage of a motor has been proposed.

For example, FIG. 41 shows an electrically-operated power steering disclosed in Japanese Patent Laid-Open Publication No. 4-8190. In FIG. 41, a motor 1 for assisting the steering is coupled to the steering system, while the steering torque of the steering system is detected in a torque sensor 2 and the vehicle speed is detected in a vehicle speed sensor 3. The current flowing through a motor 1 for assisting the steering is detected in motor current detection means 4 and the voltage applied to a motor 1 is detected in motor-applied voltage detection means 5. The motor current for statically assisting the steering torque is calculated in steering-force assist current calculation means 9. The steering torque Vt detected by the torque sensor 2 and the vehicle speed Vs detected by the vehicle speed sensor 3 are input as data for calculation to the steering-force assist current calculation means 9 and a steering-force assist current target Is is output as the calculated result therefrom.

The current flowing through the motor 1 is controlled by motor current control means 10, to which a motor current target Ia* and the value of motor current Ia$^{rms}$ detected by the motor current detection means 4 are input and from which a motor drive signal is output to the motor 1 on the basis of input current. The angular velocity of the motor 1 is calculated by motor angular velocity calculation means 11, to which the detected value of motor-applied voltage Va$^{rms}$ and the detected value of motor current Ia$^{rms}$ are input and from which the motor angular-velocity estimate ω calculated from these detected values is output.

To motor angular acceleration calculation means 12, the motor angular acceleration estimate ω calculated by motor angular velocity calculation means 11 is input and the motor angular acceleration estimate dω/dt obtained by differentiating this estimate ω is output therefrom. A value of motor current Id required for compensating the viscous friction of the steering system is calculated by viscous-friction compensating current calculation means 14, to which the motor angle estimate Θ and the motor angular velocity estimate ω described later as well as the vehicle speed Vs detected by a vehicle speed sensor 3 are input and from which a viscous-friction compensating motor current target Id calculated from these input values is output.

Inertia compensating current calculation means 15 for calculating the motor current for compensating the inertial moment of the steering system calculates and outputs inertia compensating motor current target Ij on the basis of the motor angular-acceleration estimate d ω/dt. After inputting the motor angular velocity estimate ω calculated by motor angular velocity calculation means 11, motor angle calculation means 16 calculates a motor angle estimate Θ by integration and outputs the obtained estimate. Hereinafter, the operation will be described. A steering wheel is steered by a driver, then a steering torque is generated in the steering system and detected by a torque sensor 2, when the steering-force assist current calculation means 9 calculates a steering force assist current target Is, e.g., as shown in FIG. 42, on the basis of the vehicle speed Vs input from the vehicle speed sensor 3 and the steering torque Vt input from the torque sensor 2 and the calculated result is given to motor current control means 10 as a motor current target Ia*.

The motor current control means 10 performs such a feedback control that the detected value Ia$^{rms}$ of motor current may coincide with the motor current target Ia* and further drives the motor 1. Once the motor 1 is driven, the voltage applied to the motor 1 is detected by motor-applied voltage detection means 5 and the detected value is given as detected value Va$^{rms}$ of motor-applied voltage to motor angular-velocity calculation means 11.

In motor angular-velocity calculation means 11, a motor angular velocity estimate ω is calculated from the detected calculates from the motor angular acceleration estimate d ω/dt inertia compensating current target Ij, effective in alleviating the feeling of inertia to make the steering force heavier under influence of the inertial moment of the rotor in a motor 1 especially at the time of reversal in steering direction, and adds the target obtained to the steering-force assist current target Is. In this manner, by subtracting the viscous-friction compensating current target Id from and adding the inertia compensating current target Ij to the steering-force assist current target Is, the motor current target Ia* is found and given to motor current control means 10, so that the motor current is controlled in the following similar procedure.

Here, the function of motor angular velocity calculation means 11 will be described in detail. Assuming the motor 1 is a separately excited DC motor, the equivalent circuit of the armature in the motor 1 can be expressed as FIG. 43, where Ra: Armature resistance;
La: Armature impedance;
Ve: Motor induced voltage;
Va: Motor applied voltage; and
Ia: Motor current.

In FIG. 43, on neglecting the transient term based on value Va$^{rms}$ of motor-applied voltage and from the detected value Ia$^{rms}$ of motor current and given to motor angular acceleration calculation means 12, motor angular velocity calculation means 16 and viscous-friction compensating current calculation means 14. In motor angular acceleration calculation means 12, a motor angular acceleration estimate d ω/dt is determined by differentiating the motor angular velocity estimate ω and given to inertia compensating current calculating means 15.

In motor angle calculation means 12, the motor angle Θ is determined by integrating the motor angular velocity estimate ω and given to viscous-friction compensating current calculating means 14. In viscous-friction compensating current calculating means 14, a feeling of viscosity is imparted to steering feel from the vehicle speed Vs, the motor angular velocity estimate ω and the motor angle estimate Θ and moreover a viscous-friction compensating current target id, effective for enhancing the convergence of steering wheel return likely to worsen particularly during high-speed driving, is calculated. Then, this target Id is subtracted from the steering-force assist current target Is in an adder.

Inertia compensating current calculation means 15 the armature inductance La, Va can be expressed in the following equation (1):

$$Va = Ia \cdot Ra + Ve \tag{1}$$

Letting

Ke: Motor-induced voltage constant; and

ωm: Motor angular velocity;

Ve is expressed in the following equation (2):

$$Ve = Ke \cdot \omega m \tag{2}$$

Thus, the following equation (3) is obtained from Eqs. (1) and (2):

$$\omega m = (Va - Ia \cdot Ra)/Ke \tag{3}$$

Now, as Ra and Ke are constants the detected values can be used for Va and Ia, the motor angular velocity can be estimated by expressing Eq. (3) as Eq. (4).

$$\omega = (Va^{ans} - Ia^{ans} \cdot Ra)/Ke \tag{4}$$

where

ω=Motor angular velocity estimate;

$Va^{ans}$=Detected value of motor applied voltage; and $Ia^{ans}$=Detected value of motor current.

Assuming that the motor 1 is PWM-driven, the relation between Va and Ia is nearly as shown in FIG. 44 and repeats a transient phenomenon at each switching between power running and regenerative running. Generally, the PWM carrier period is set to be sufficiently short for the electric time constant of a motor 1, so that Ia can be regarded as DC but Va becomes a square wave. Thus, for finding the motor angular velocity ω in accordance with Eq. (4), it is necessary to remove the square wave component of Va and obtain the time average of Id.

In motor angular velocity calculation means 11, after sampling the detected value of square-waved motor-applied voltage, the square wave component is removed by using a digital filter and ω is calculated in according with Eq. (4).

With a conventional electrically-operated power steering apparatus, a motor is PWM-driven to suppress the heating of a switching element for motor drive control and the PWM carrier frequency is set to around 20 kHz outside the audible frequency band to prevent noise from occurring in the motor drive as described above. Thus, if it is arranged as with a conventional apparatus for the motor angular velocity calculation means to be implemented by software processing and for the square wave component of the motor-applied voltage Va to be removed by using a digital filter, the sample frequency must be set to a very high level to accurately calculate the motor angular velocity ω and consequently the software processing is heavily overloaded, thereby leading to the problem of having to use an expensive CPU with high processing speed.

In addition, the armature resistance Ra includes wiring resistance between the motor and the controller and contact resistance of a connector and the variation in the armature resistance of individual motors is large. Furthermore, the armature resistance Ra varies under the influence of temperature, such as heating in the flow of a heavy current. Thus, errors are naturally considered to be contained in armature resistance. Here, letting ΔRa be the error between the Ra used for calculation in accordance with Eq. (4) and the actual Ra, the motor angular velocity ω can be expressed in the following equation (5).

$$\omega = \{Va^{ans} - Ia^{ans} \cdot (Ra + \Delta Ra)\}/Ke \tag{5}$$

It is found from the above eq. (5) that an error in Ra appears as an error in ω and the resultant error is proportional to the motor current Ia. Accordingly, a conventional apparatus has a problem that, when a heavy current flows through a motor, a DC error in ω i.e., offset is generated. As a result, there occurs a problem when turning curve, for example, that ω does not become 0 in spite of holding the steering wheel.

Furthermore, it is difficult to implement the differential calculation section (refer to 12 in FIG. 41) for accurately calculating a motor angular acceleration estimate dω/dt from the motor angular velocity ω and the sampling frequency must be set high to implement a noiseless and accurate differential calculation that can be used for the control of a steering system especially by means of software processing.

This is because the motor angular acceleration estimate dω/dt is abundant in noise which is obtained from differential calculation at a sampling frequency implementable by the slow processing speed, inexpensive CPU's, widely used in an electrically-operated power steering apparatuses. Thus, there has been a problem that using an inexpensive CPU for cost-saving in the control of an electrically-operated power steering apparatus causes a ripple to be generated in motor current, the steering wheel to vibrate or noise to occur.

On the other hand, compared with a manual steering, steering wheel return when grip is loosened worsens, especially in the low vehicle speed region where the restoring force of wheels to the neutral position is small, because of the moment of inertia intrinsic to a motor attached to the steering mechanism and friction caused by the gear coupling the motor to the steering system with an electrically-operated power steering apparatus. Besides this, there has been another problem that the feedback of motor angular velocity obtained in software processing improves the convergence of steering wheel return in the high vehicle speed region but worsens more in steering wheel return in the low vehicle speed region and the steering wheel does not easily return to the neutral position when getting back to a straight road after the completion of turning a curve.

Furthermore, there is yet another problem in that the friction of a gear coupling the motor to the steering system weighs the steering feeling near neutral, i.e., center feel, during driving and causes a so-called frictional feeling. Similarly, the negative feedback of motor angular velocity as in conventional apparatuses has tended to worsen this problem.

SUMMARY OF THE INVENTION

For solving these problems, it is one object of the present invention to provide an electrically-operated power steering apparatus capable of eliminating the troubles related to steering wheel return, viscous feeling, inertial feeling and the like and of improving the feeling of steering without the need to newly install a sensor or use a high processing speed CPU.

An electric power steering apparatus according to one aspect of the invention comprises: a motor connected to the steering system; PWM control means for driving and controlling said motor on the basis of a PWM modulated control signal; motor-applied voltage detection means having a low pass characteristic for converting the detected voltage applied to said motor to a predetermined level after removing said PWM carrier frequency component therefrom with the aide of the low-pass characteristic and outputting the resultant voltage wherein the cutoff frequency set below the PWM carrier frequency contained in said control signal; angular velocity estimation means for estimating the angular velocity of said motor on the basis of the detected motor-applied voltage; and current value calculation means for calculating the current target of said motor on the estimated result of angular velocity. Thus, there is an advantage that, by estimating said motor angular velocity on the detected value of motor-applied voltage, detected after removing the square wave component in a circuit having a low-pass characteristic, on the basis of the detected value of motor-applied voltage wherein the cutoff frequency is lower than the PWM carrier frequency used for the drive of the motor, the motor angular velocity can be accurately estimated even for a lower sampling frequency than that of a conventional apparatus.

An electric power steering apparatus according to another aspect of the invention comprises: a motor connected to the steering system; PWM control means for driving and controlling said motor on the basis of a PWM modulated control signal; motor terminal voltage detection means having a low-pass characteristic for converting the detected terminal voltage of said motor to a predetermined level after removing said PWM carrier frequency component therefrom with the aide of the low-pass characteristic and outputting the resultant voltage wherein the cutoff frequency set below the PWM carrier frequency contained in said control signal; angular velocity estimation means for estimating the angular velocity of said motor on the basis of the detected motor terminal voltage; and current value calculation means for calculating the current target of said motor on the estimated result of angular velocity. Thus, there is an advantage that, by estimating said motor angular velocity on the detected value of motor-applied voltage, detected after removing the square wave component in a circuit having a low-pass characteristic, on the basis of the detected value of motor terminal voltage wherein the cutoff frequency is lower than the PWM carrier frequency used for the drive of the motor, the motor angular velocity can be accurately estimated even for a lower sampling frequency than that of a conventional apparatus.

In a preferred form, the motor angular velocity estimate is clipped below a predetermined value in accordance with a current through said motor. Thus, there is an advantage that, by correcting the motor angular velocity estimate in accordance with a current through said motor, an error in said motor angular velocity estimate can be reduced.

In another preferred form, the motor angular velocity estimate is clipped below a predetermined value in accordance with the steering torque. Thus, there is an advantage that, by correcting the motor angular velocity estimate in accordance with the steering torque, an error in said motor angular velocity estimate can be reduced.

In yet another preferred form, the motor angular velocity estimate is clipped to 0 if the calculated result of motor angular acceleration is below a predetermined value. Thus, there is an advantage that an error in said motor angular velocity estimate can be reduced.

In still another preferred form, the motor angular velocity estimate is subjected to a high-pass filtering if said PWM carrier frequency is above a predetermined frequency. Thus, there is an advantage that the offset of motor angular velocity estimate can be removed.

In a further preferred form, the motor angular acceleration is estimated by differentiating the motor angular velocity estimate. Thus, these is an advantage that the motor angular acceleration can be accurately estimated even for a lower sampling frequency than that of a conventional apparatus.

In a further preferred form, the differential processing has a band pass characteristic. Thus, there is an advantage that the motor angular acceleration can be accurately estimated even for a lower sampling frequency than that of a conventional apparatus.

In a further preferred form, the motor angular velocity estimate is subjected to a low-pass filtering having a cutoff frequency nearly equal to the high-region cutoff frequency of the band pass characteristics at the time of differential processing. Thus, there is an advantage that the phase relation between the motor angular velocity estimate and the motor angular acceleration can be kept normal.

In a further preferred form, the motor angular acceleration estimate is clipped to 0 if the calculated result thereof is below a predetermined value. Thus, there is an advantage that noise contained in the motor angular acceleration estimate can be removed.

In a further preferred form, the motor angular velocity estimate is positively fed back to the steering control system and, in accordance with the positive feedback, the motor current passing is clipped below a predetermined value based on the friction of the steering system. Thus, there is an advantage that, by compensating the Coulomb friction of the steering system, the feeling of steering can be upgraded.

In a further preferred form, in clipping the motor angular velocity estimate in accordance with the positive feedback of the motor angular velocity estimate, the motor current value or the positive feedback gain of motor angular velocity is changed depending on at least either one of said motor angular velocity estimate and said vehicle speed. Thus, there is an advantage that the feeling of steering can be upgraded.

In a further preferred form, differentiation means for increasing the motor current flowing through in accordance with the positive feedback of the motor angular velocity estimate at the rising time is provided. Thus, there is an advantage that, especially by compensating the static friction of the steering system, steering feel can be upgraded.

In a further preferred form, steering control based on the angular velocity is performed by the negative feedback of the motor angular velocity estimate. Thus, there is an advantage that, especially by compensating the viscous friction of the steering system, steering feel can be upgraded.

In a further preferred form, the negative feedback gain of said motor angular velocity estimate is changed depending on at least either one of said motor angular velocity estimate and said vehicle speed. Thus, there is an advantage that the worsening of frictional feeling can be prevented, or by a change in feedback gain dependent on vehicle speed, the worsening of steering wheel return at low vehicle speed can be prevented.

In a further preferred form, steering control based on said motor angular acceleration is performed by the positive feedback of said angular acceleration estimate. Thus, there is an advantage that, especially by compensating the moment of inertia of the steering system, steering feel can be upgraded.

In a further preferred form, the positive feedback gain of said motor angular acceleration estimate is changed depending on at least either one of said motor angular acceleration estimate and said vehicle speed. Thus, there is an advantage that the vibration of a steering wheel near the steering wheel neutral point can be prevented, or by a change in feedback gain dependent on vehicle speed, the most comfortable steering feel can be realized.

DESCRIPTION OF THE PREFERRED EMBODIMENTS

Figure 41:
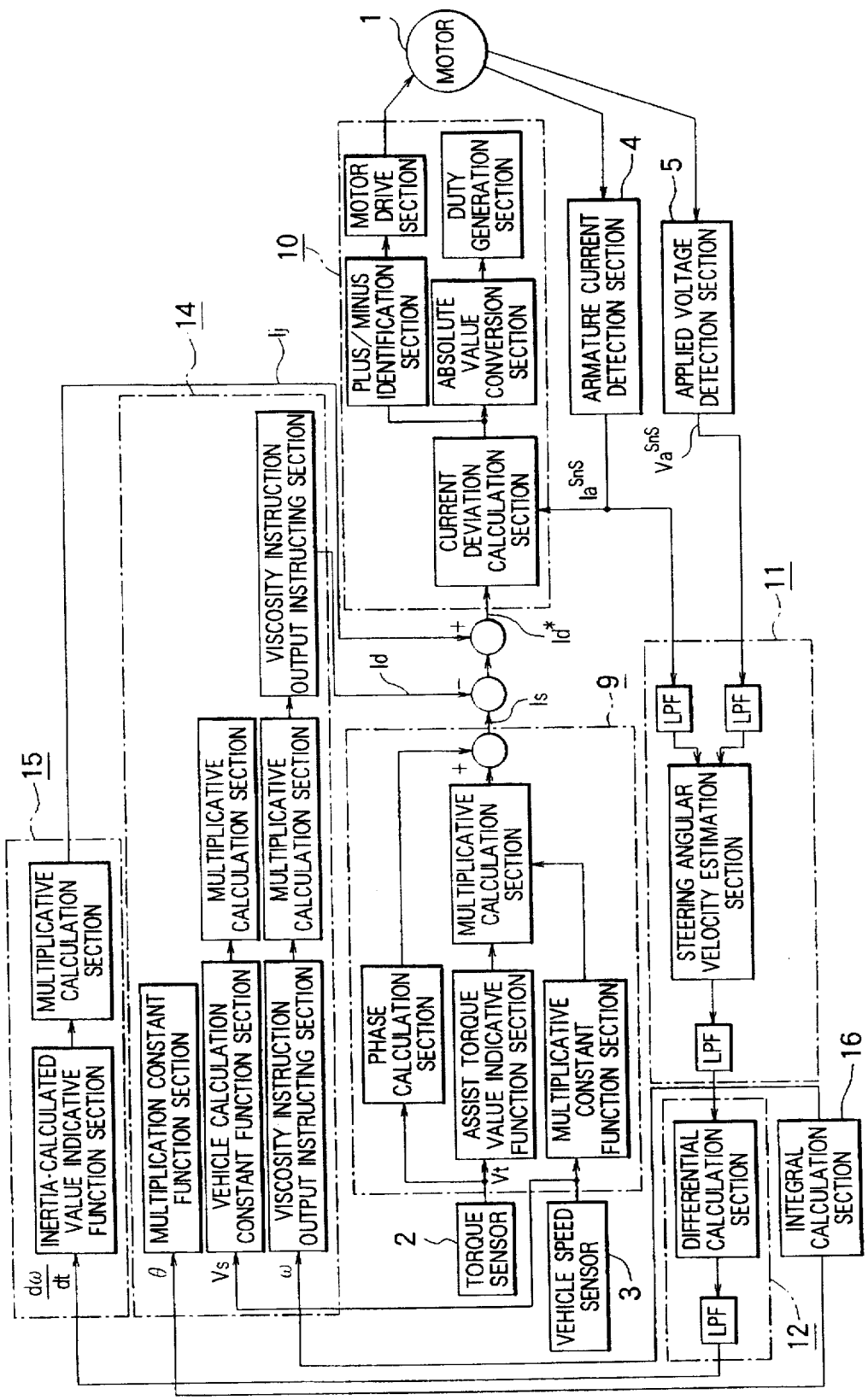
FIG. 41 is a block diagram showing the arrangement of a conventional control.

Hereinafter, preferred embodiments of the present invention will be described in detail while referring to the accompanying drawings. Throughout the embodiments, like symbols denote parts or elements similar or equivalent to those in FIG. 41.

Embodiment 1

Figure 1:
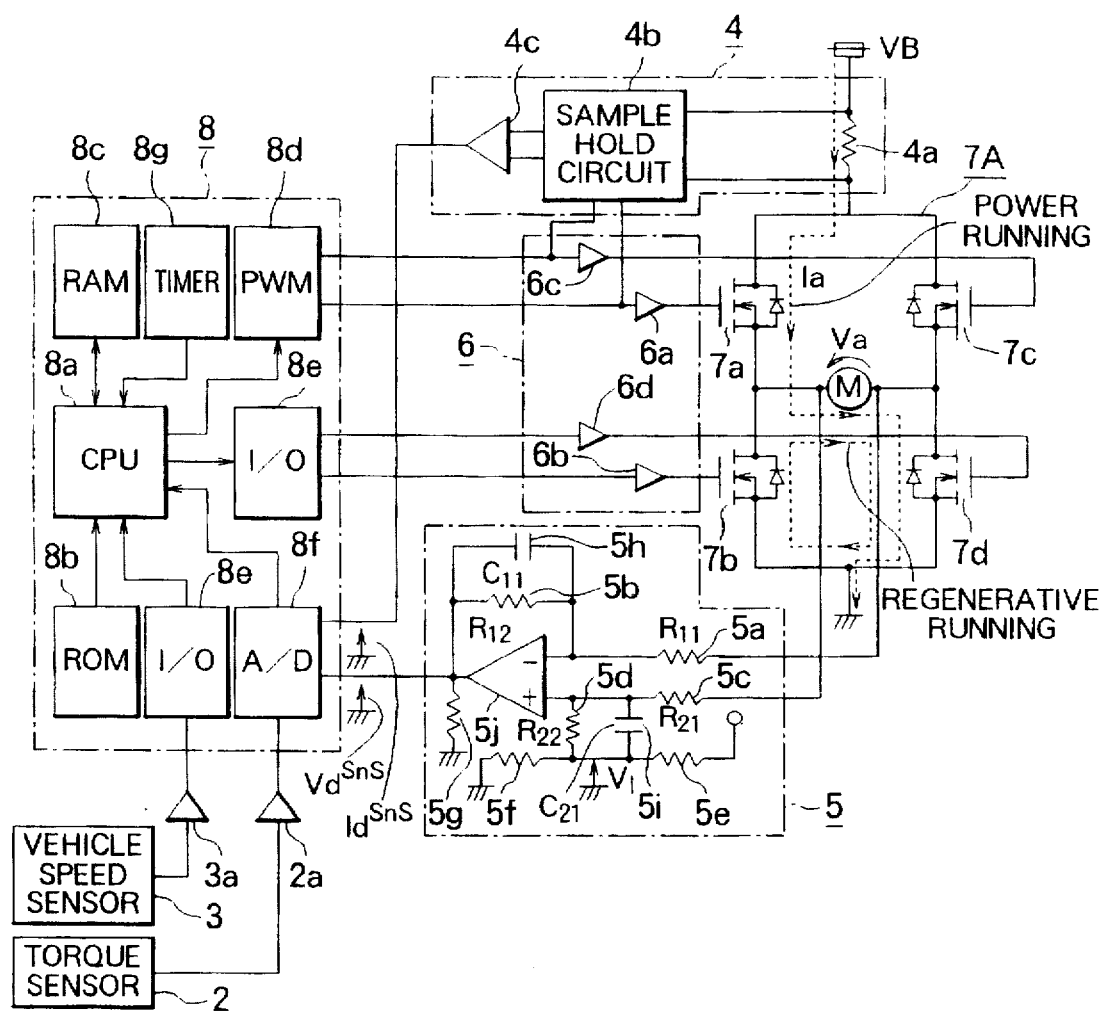
FIG. 1 is a hardware block diagram of a control according to one embodiment of the present invention.

FIG. 1 is a structural view of a controller section of an electrically operated power steering apparatus in accordance with an Embodiment 1 of the present invention. Output of a toque sensor 2 is input to the A/D convertor 8f described later via a torque sensor input I/F 2a for DC amplification an phase compensation. Output of a vehicle speed sensor 3 is input to the input/output port 8e via a vehicle sensor input I/F 3a.

Current through a motor 1 is converted with a current detecting resistor 4a to a predetermined voltage in a motor current detection circuit 4, comprising a sample/hold circuit 4b for sampling the voltage between both ends of the current detecting resistor 4a during the power running time, holding it during the regenerative running time and amplifying the held voltage in an amplification circuit 4c.

Voltage between the terminals of a motor 1 is converted to a predetermined voltage level by passing through a motor-applied voltage detection circuit 5 having a low pass filter characterized by lower predetermined pass frequency than the PWM carrier frequency and input to the A/D convertor 8f described later. The motor-applied voltage detection circuit 5 comprises an OP amplifier 5j and filter constants composed of resistors 5a–5g and capacitors 5h–5i.

An H-shaped bridge circuit 7 for passing current for right-handed and left-handed rotations comprises four bridge-connected power MOSFETs 7a–7d to be driven by FET drivers 6a–6d. A microcomputer 8 for outputting a drive signal to H-shaped bridge drive circuit 6 comprises: a CPU 8a; a ROM 8b for storing programs and the like; a RAM 8c for temporarily holding data and the like; a pulse width modulator 8d connected to FET drivers 6a, 6c for generating a pulse to drive the motor 1; I/O port 8e connected to FET drivers 6b, 6d and connected via vehicle speed sensor input I/F 3a to the vehicle speed sensor 3; an A/D convertor 8f connected to the output of the motor current detection circuit 4 and that of the motor-applied voltage detection circuit 5 and connected via a torque sensor input I/F 2a to the torque sensor 2; and a timer 8g to be used for managing the control period or the like.

Figure 2:
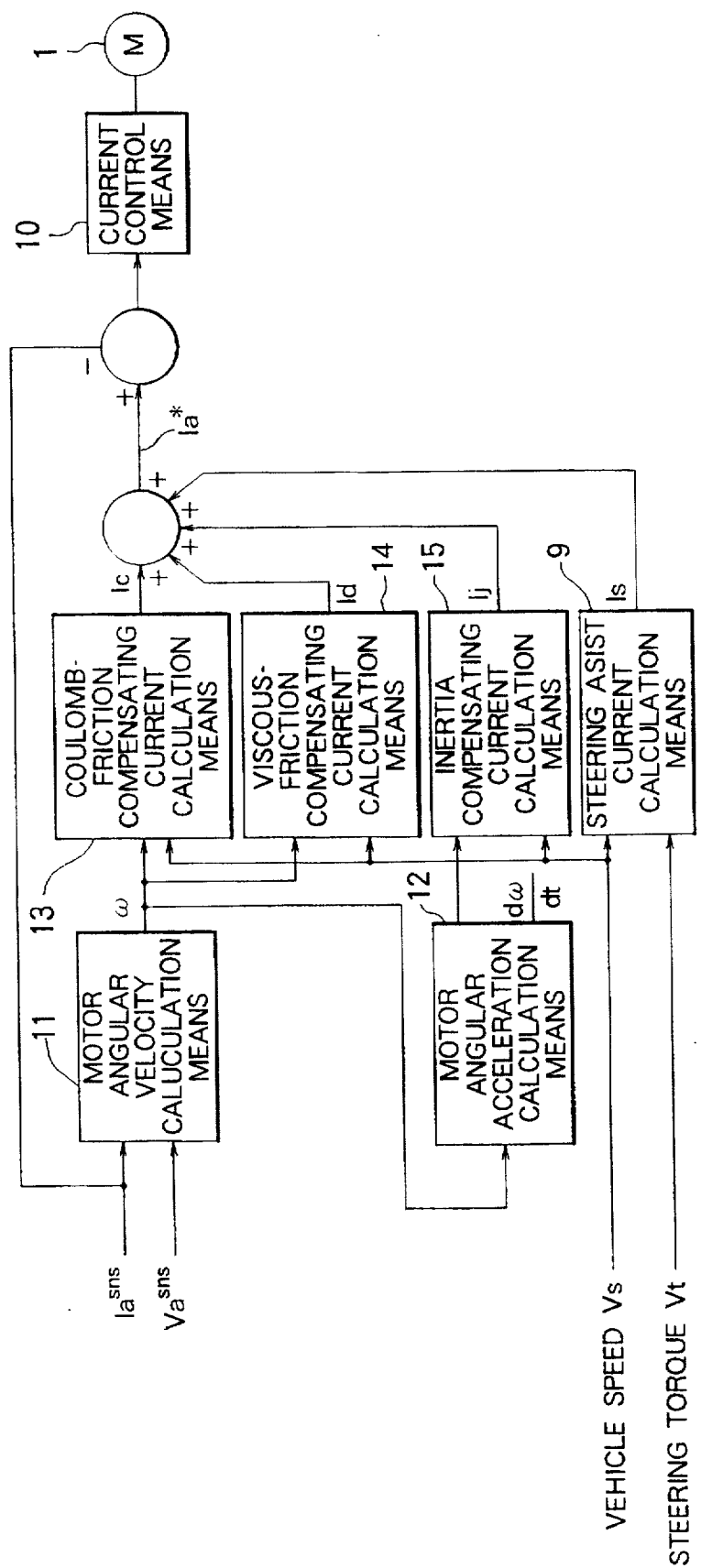
FIG. 2 is a software block diagram of a control according to one embodiment of the present invention.

FIG. 2 is an S/W block diagram of the steering control processed by the CPU 8a. To steering force assist current calculation means 9 for calculating the motor current used for statically assisting the steering torque, the steering torque Vt detected by the torque sensor 2 and the vehicle speed Vs detected by the vehicle speed sensor 3 are input and the steering force assist current target Is is output therefrom.

To motor current control means 10 for controlling the current flowing through the motor 1, the motor current target Ia* and the detected value of motor current $Ia^{sns}$ detected by motor current detection means 4 are input and a motor drive signal is output therefrom on the basis of both input values of motor current. To motor angular velocity calculation means 11 for calculating the angular velocity estimate ω of the motor 1, the detected value of motor-applied voltage $Va^{sns}$ detected by motor-applied voltage means 5 and the detected value of motor current $Ia^{sns}$ detected by motor current detection means 4 are input and the motor angular-velocity estimate ω is output therefrom on the basis of these detected values.

To motor angular-acceleration calculation means 12, the motor angular-velocity estimate ω calculated by motor angular-velocity calculation means 11 is input and the motor angular-acceleration estimate d ω/dt obtained by differentiating this motor angular-velocity estimate ω is output therefrom. To Coulomb-friction compensating current calculation means 12 for calculating the motor current for compensating the Coulomb friction of the steering system, the motor angular-velocity estimate ω and the vehicle speed Vs detected by the vehicle speed sensor 3 are input and a Coulomb-friction compensating current target Ic is output therefrom on the basis of these input values.

To viscous-friction compensating current calculation means 14 for calculating the motor current for compensating the viscous friction of the steering system, the motor angular velocity estimate ω and the vehicle speed Vs detected by a vehicle speed sensor 3 are input and a viscous-friction compensating motor current target Id is output therefrom on the basis of these input values. To inertia-compensating current calculation means 15 for calculating the motor current for compensating the inertial moment of the steering system, the motor angular-acceleration estimate d ω/dt is input and an inertia compensating motor current target Ij is output therefrom.

Figure 3:
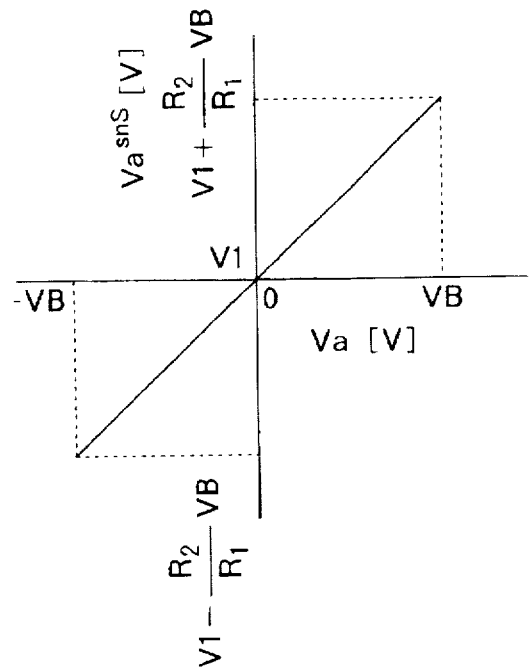
FIG. 3 is a graph showing the DC characteristic of a motor-applied voltage detection circuit in a control according to one embodiment of the present invention.
Figure 4:
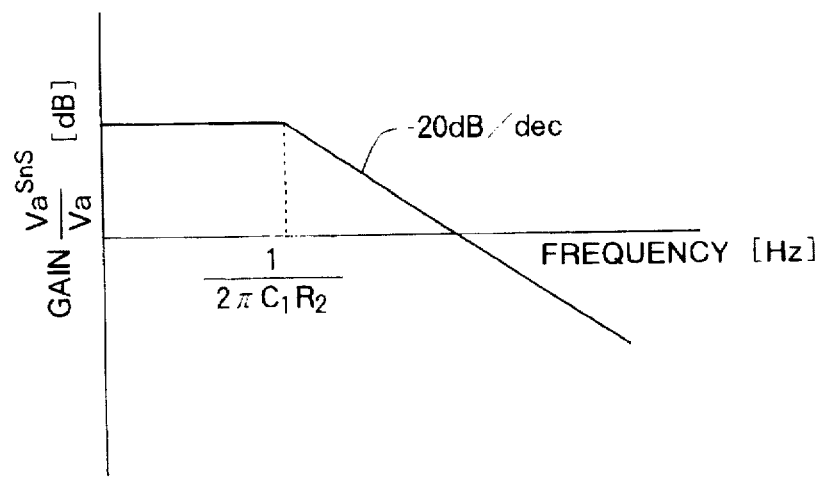
FIG. 4 is a graph showing the frequency characteristic of a motor-applied voltage detection circuit in a control according to one embodiment of the present invention.

FIGS. 3 and 4 show the DC characteristic and the frequency characteristic of a motor-applied voltage detection circuit 5, respectively.

Figure 5:
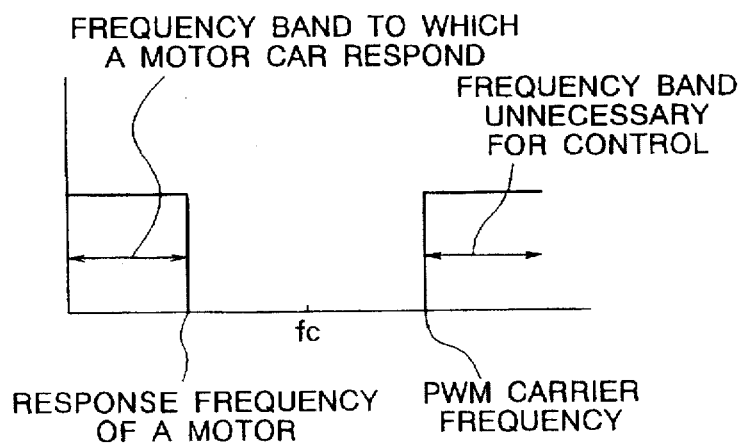
FIG. 5 is a graph illustrating a method for setting the cutoff frequency in a motor-applied voltage detection circuit or a motor terminal voltage detection circuit in a control according to one embodiment of the present invention.

FIG. 5 illustrates a method for setting the cutoff frequency of a motor-applied voltage detection circuit 5.

Figure 6:
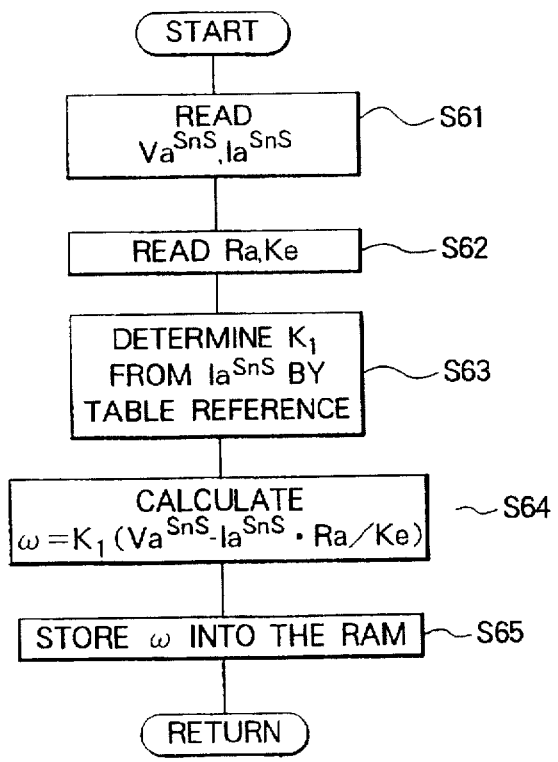
FIG. 6 is a flowchart illustrating the operation of motor angular velocity calculation means in a control according to one embodiment of the present invention.
Figure 7:
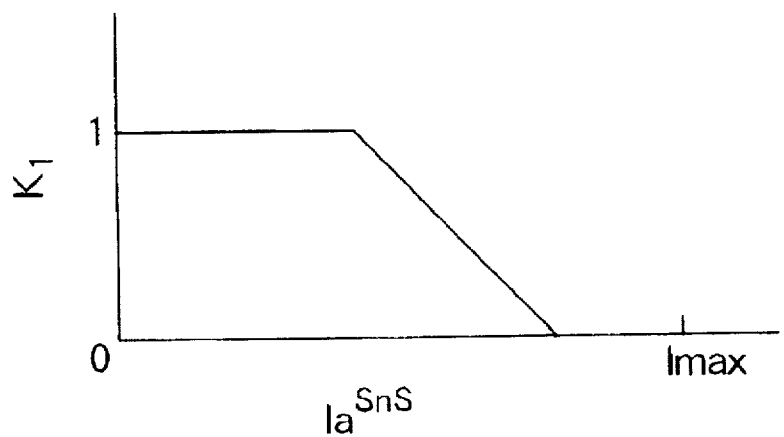
FIG. 7 is a graph illustrating the relation between the coefficient for correcting a motor angular velocity estimate and the motor current in a control according to one embodiment of the present invention.

FIG. 6 is a flowchart to illustrate the operation of motor angular velocity calculation means 11, while FIG. 7 illustrates a coefficient K1 for correcting the motor angular velocity estimate ω.

Figure 8:
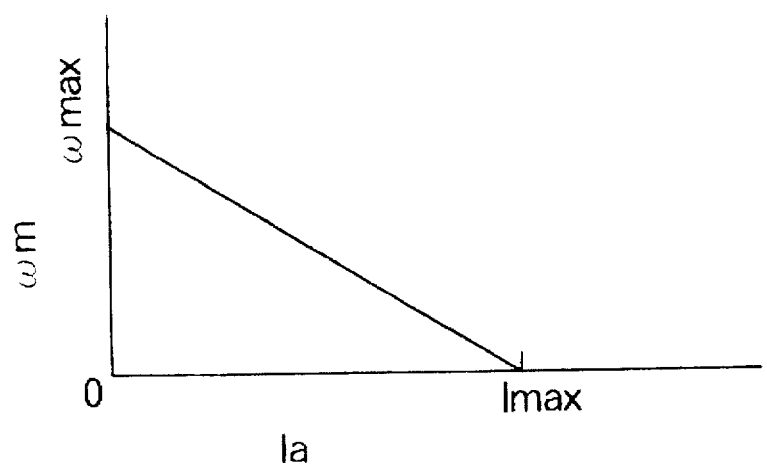
FIG. 8 is a graph illustrating the relation between motor current and motor angular velocity in a DC motor.

FIG. 8 illustrates the relation between the motor current Ia and the motor angular-velocity ωm.

Figure 9:
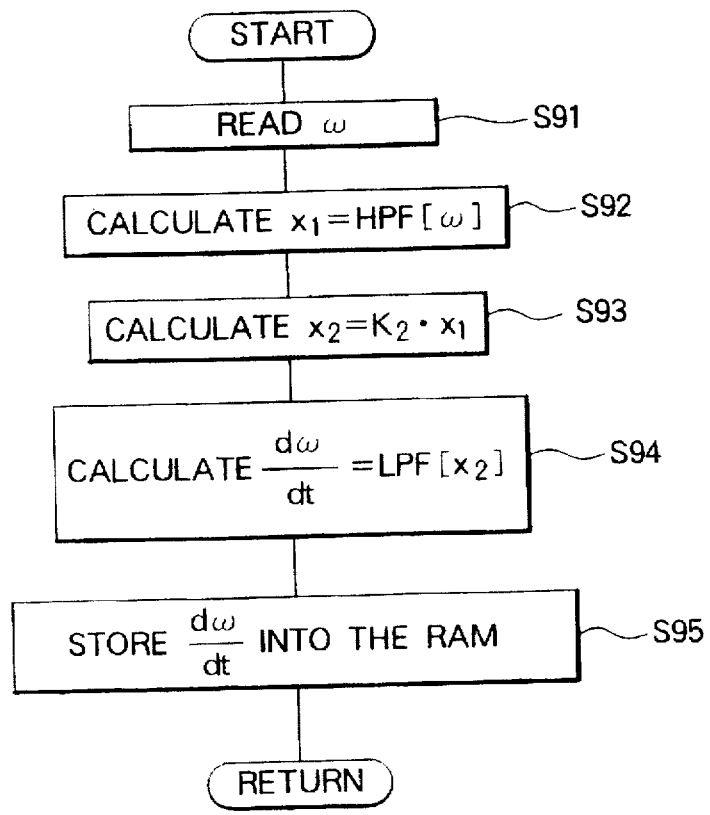
FIG. 9 is a flowchart illustrating the operation of motor angular acceleration calculation means in a control according to one embodiment of the present invention.
Figure 10:
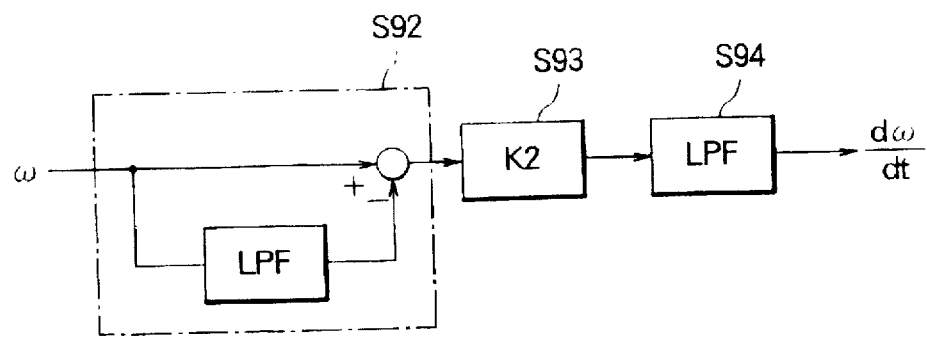
FIG. 10 is a block diagram illustrating the operation of motor angular acceleration calculation means in a control according to one embodiment of the present invention.
Figure 11:
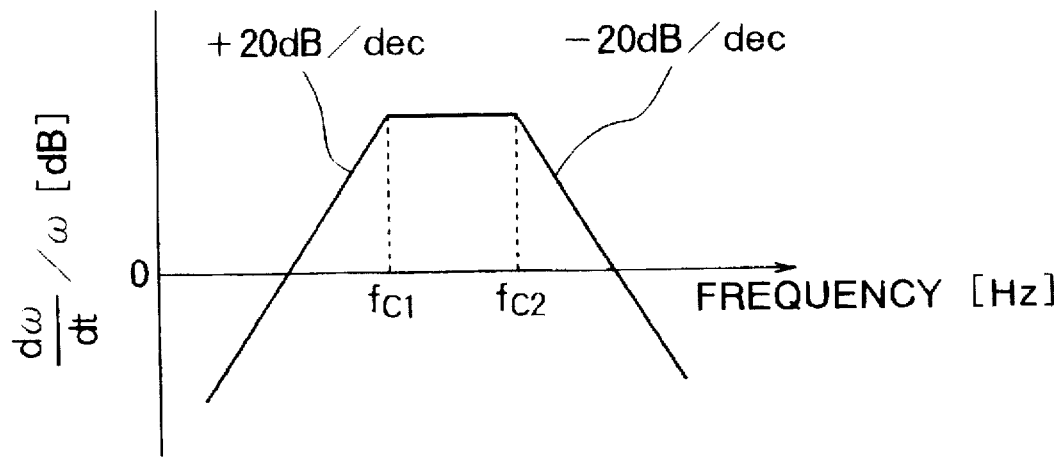
FIG. 11 is a graph showing the frequency characteristic of motor angular acceleration calculation means in a control according to one embodiment of the present invention.
Figure 12:
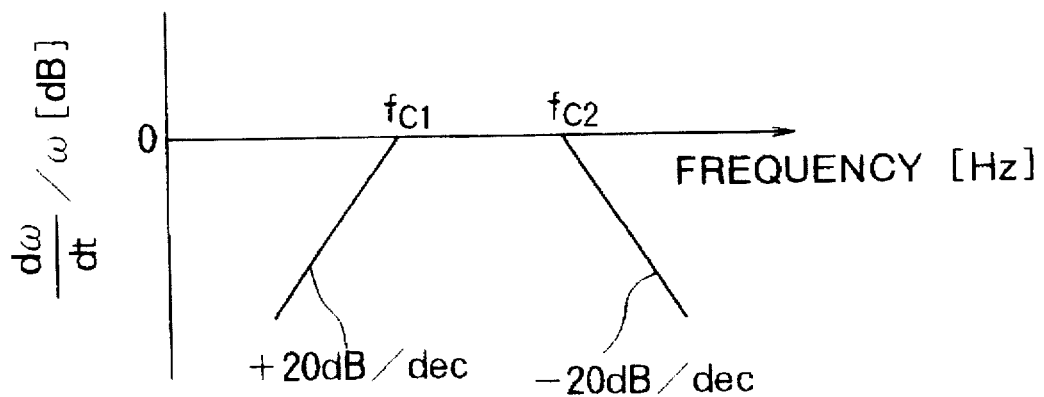
FIG. 12 is another graph showing the frequency characteristic of motor angular acceleration calculation means in a control according to one embodiment of the present invention.

FIG. 9 is a flowchart to illustrate the operation of motor angular acceleration calculation means 12. FIG. 10 is a block diagram representing the function of motor angular acceleration calculation means 12. FIGS. 11 and 12 indicate the frequency characteristics thereof.

Figure 13:
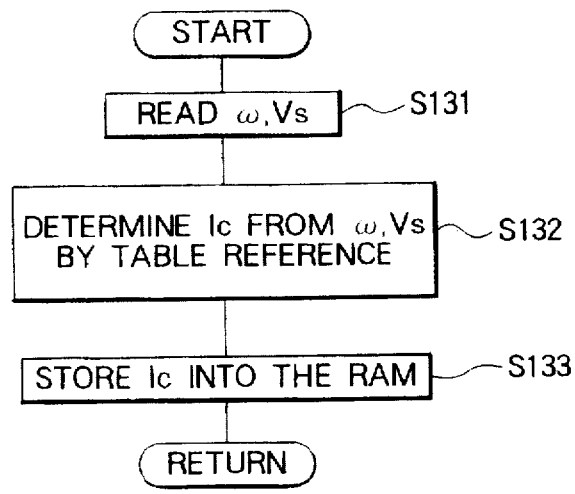
FIG. 13 is a flowchart illustrating the operation of Coulomb-friction compensation current calculation means in a control according to one embodiment of the present invention.
Figure 14:
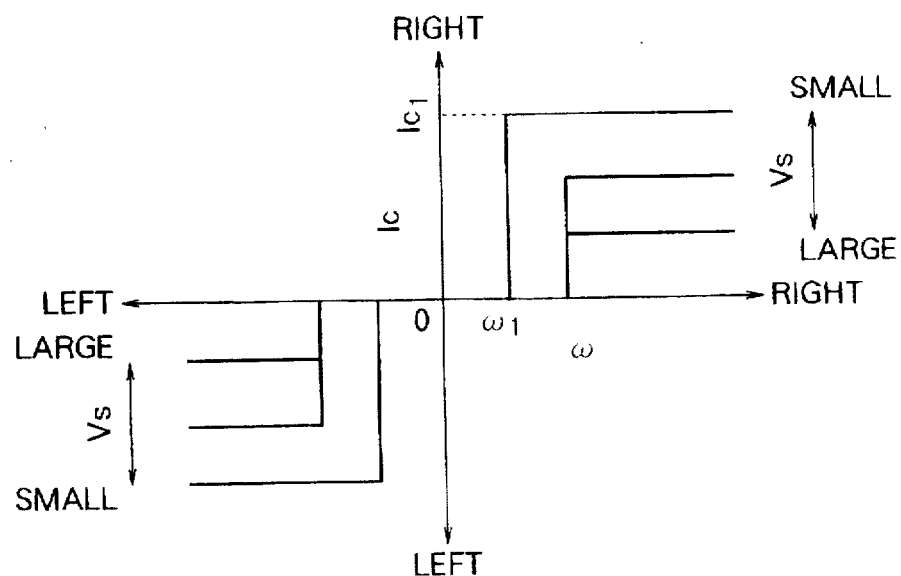
FIG. 14 is a graph illustrating the relation between the motor angular velocity estimate and the vehicle speed and the Coulomb-friction compensation current in a control according to one embodiment of the present invention.

FIG. 13 is a flowchart to illustrate the operation of Coulomb-friction compensating current calculation means 13. FIG. 14 illustrates the relation among the motor angular velocity estimate ω and the vehicle speed Vs and the Coulomb-friction compensating current Ic.

Figure 15:
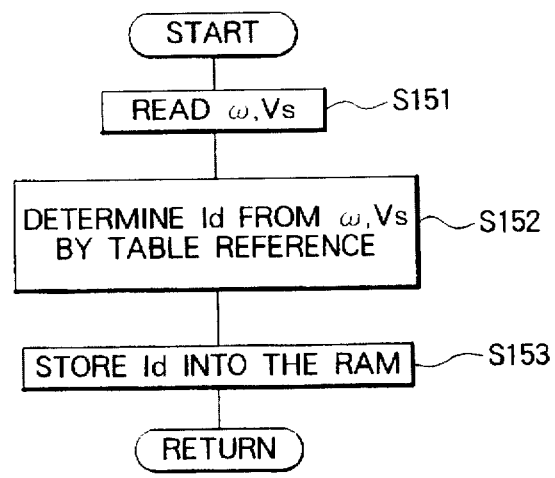
FIG. 15 is a flowchart illustrating the operation of viscous-friction compensation current calculation means in a control according to one embodiment of the present invention.

FIG. 15 is a flowchart to illustrate the operation of viscous-friction compensating current calculation means 14.

Figure 16:
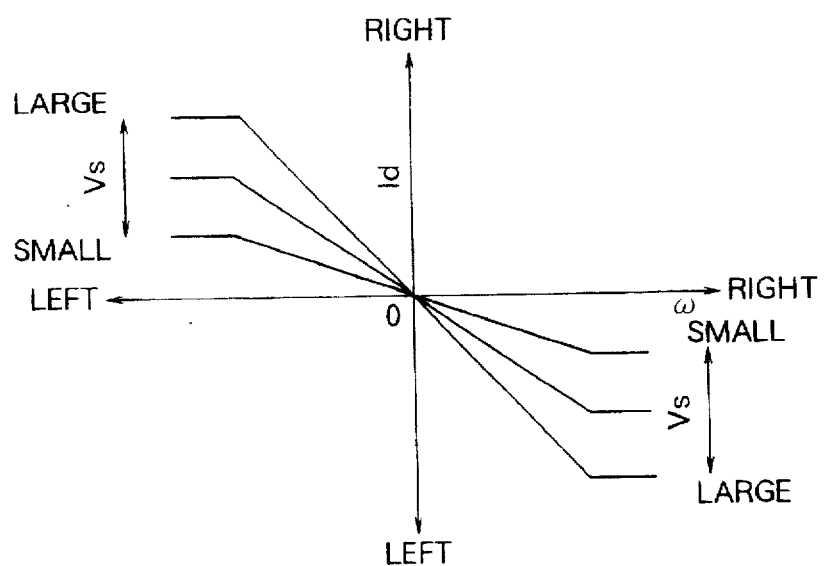
FIG. 16 is a graph illustrating the relation between the motor angular velocity estimate and the vehicle speed and the viscous-friction compensation current in a control according to one embodiment of the present invention.

FIG. 16 illustrates the relation among the motor angular velocity estimate ω and the vehicle speed Vs and the viscous-friction compensating current Id.

Figure 17:
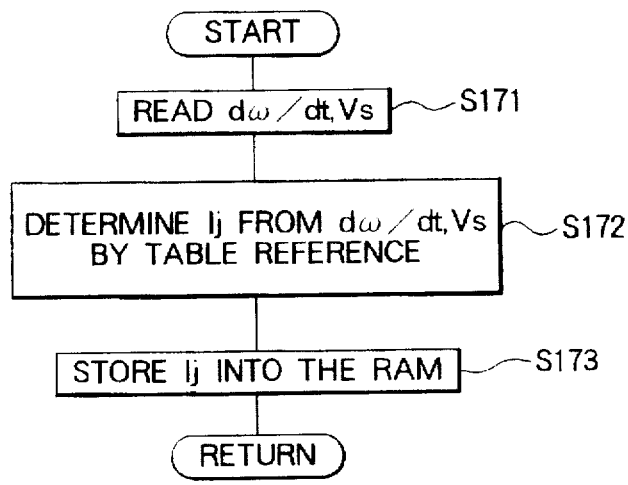
FIG. 17 is a flowchart illustrating the operation of inertia compensation current calculation means in a control according to one embodiment of the present invention.
Figure 18:
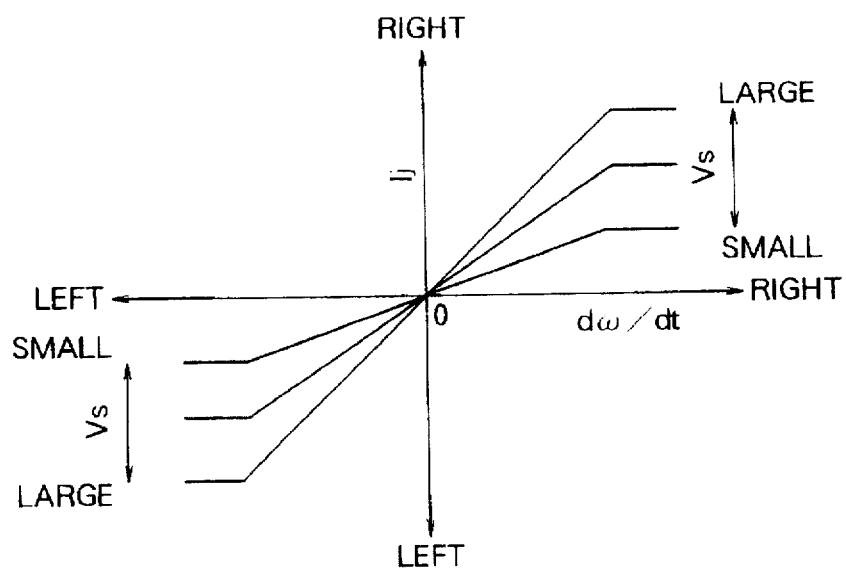
FIG. 18 is a graph illustrating the relation between the motor angular velocity estimate and the vehicle speed and the inertia compensation current in a control according to one embodiment of the present invention.

FIG. 17 is a flowchart to illustrate the operation of inertia-compensating current calculation means 15. FIG. 18 illustrates the relation among the motor angular acceleration estimate dω/dt and the vehicle speed Vs and the inertia-compensating current Ij.

Next, the operation of this embodiment will be described where the motor current Ia is passing in the direction of the broken line in FIG.1 as one example. In accordance with an instruction of the microcomputer 8, the FET drivers 6b and 6c turn OFF the power MOSFET's 7b and 7c, the FET driver 6d turns ON the power MOSFET 7d and the FET driver 6a PWM-drives the power MOSFET 7a at a predetermined duty ratio.

Depending on the ON or OFF state of the power MOSFET 7a, motor current Ia flows along the path indicated by the power running or the regenerative running in FIG. 1, respectively. In the motor current detection circuit 4, the motor current Ia is first converted into voltage by the current detecting resistor 4a. However during the regenerative running time, the motor current Ia does not flow through the current detecting resistor 4a as shown in FIG. 1. For this reason, while the power MOSFET 7a is ON, i.e., during the power running time, voltage between both ends of the current detecting resistor 4a is sampled in the sample hold circuit 4b and the sampled voltage is held while the power MOSFET 7a is OFF, i.e., during the regenerative running time. Thereafter, the held voltage is amplified at a predetermined gain in the amplification circuit 4c, input to the A/D convertor 8f in the microcomputer 8 and digitally converted. Then, the digitally converted current is detected by the microcomputer 8.

The motor-applied voltage detection circuit 5 removes the square component appearing in the motor-applied voltage Va in association with the PWM drive and moreover inputs the resultant component to the A/D convertor 8f after converting it to a predetermined voltage level so that input to A/D convertor 8f becomes possible.

Here, the motor-applied voltage detection circuit 5 will be described in detail. Regarding the OP amplifier as an ideal OP amplifier and assuming that $$R11 = R21 = R1 \tag{6}$$

$$R12 = R22 = R2 \tag{7}$$

$$C11 = C21 = C1 \tag{8}$$

the relation between the motor-applied voltage Va and the detected value of motor-applied voltage Va$^{rns}$ in s-region (s: Laplace operator) is found as follows:

$$Va^{rns} = V1 + (Va \cdot (R2/R1))/(1+(C1 \cdot R2 \cdot s)) \tag{9}$$

On seeing Eq. (9), it is found that Va$^{rns}$ is equal to voltage obtained by attaching the first-order retardation characteristic of a time constant C1·R2 to the R2/R1 divided voltage of Va and further adding the result to a DC bias voltage V1. That is, the DC characteristic and the frequency characteristic become as shown in FIG. 3 and in FIG. respectively.

In Eq. (9), it is advisable to set V1 at the center (e.g., 2.5V) of the input voltage range (e.g., 0 to 5V) of the A/D convertor 8f. Furthermore, as for resistor R11=R12 =R1, R21=R22=R2 and capacitor C11=C21=C1, R2/R1 is set in such a manner that the voltage range of Va (e.g., −12 to 12V) is changed in level to the input voltage range (e.g., 0 to 5V) of the A/D convertor 8f. And, as shown in FIG. 5, the cutoff frequency fc=1/(2π·C1·R2) is set in such a manner as to be sufficiently lower than the PWM carrier (e.g., 20 kHz) and to be sufficiently higher than the motor response function (e.g., some hundred Hz).

In this way, there is secured a band width within which the steering system is controllable and the detected value of motor-applied voltage Va$^{rns}$ from which the square wave component has been removed can be input to the A/D convertor 8f.

Next, the operation of software according to this embodiment will be described by referring to FIG. 2. Steering -force assist current target is calculated on the basis of steering torque and vehicle speed, motor angular velocity estimate is calculated from the detected value of motor-applied voltage and that of motor current and a motor angular acceleration is calculated from the calculated result. Furthermore, each compensating current target is calculated from the calculated motor angular velocity estimate and motor angular acceleration estimate, motor current target is determined by adding the aforesaid steering-force assist current target and the aforesaid respective compensating current targets together from these calculated results and the feedback control of this motor current target is performed. Such an outline of operations is the same with a conventional apparatus. In addition, steering-force assist current calculation means 9 and current control means 10 have the same functions as those in a conventional apparatus and thus the description thereof will be omitted.

Hereinafter, the operation will be described for each block. First, motor angular velocity calculation means 11 calculates a motor angular velocity estimate ω from the detected value of motor-applied voltage Va$^{rns}$ and that of motor current Ia$^{rns}$ in accordance with Eq. (4). Referring to the flowchart of FIG. 6, this procedure will be described.

First of all, the A/D converted data of the detected value of motor-applied voltage Va$^{rns}$ and that of motor current Ia$^{rns}$ in S61 is read and the constant data of armature resistance Ra and motor-induced voltage constant Ke is read from the ROM in S62. Next, in S63, referring to a predetermined $Ia^{rms}$–K1 table, the coefficient K1 is determined from the detected value of motor current $Ia^{rms}$ read in S61. Finally, in S64, a motor angular velocity estimate ω is calculated from Eq. (4) and the K1, is determined in S63, and Eq.(10) below, and the obtained estimate ω is stored in the RAM 8c.

$$\omega = K1 \cdot (Va^{rms} - Ia^{rms} \cdot Ra)/Ke \qquad (10)$$

Here, the $Ia^{rms}$–K1 table and K1 will be described in detail. In calculating a motor angular velocity estimate ω in accordance with Eq. (4), the error in motor angular velocity estimate ω attributable to the error in armature resistance Ra is proportional to the motor current Ia and increases with an increase in motor current Ia as shown by Eq. (5). That is, the offset of motor angular velocity estimate ω increases with an increase in motor current Ia. Generally if the voltage applied to a motor is constant, however, there is a relation between the motor current Ia and the motor angular velocity ωm such that the motor angular velocity ωm decreases with an increase in motor current Ia as shown in FIG. 8.

Thus, when a heavy current flows through the motor 1, it is advisable to clip the motor angular velocity estimate ω to 0. At that time, the motor angular velocity estimate ω may be set to ω=0 when the detected value of motor current $Ia^{rms}$ exceeds a predetermined threshold but, in order to avoid a radical change in motor angular velocity estimate ω, it is advisable to multiply the motor angular velocity estimate ω determined from Eq. (4) by a coefficient K1 that is 1 for a detected value of motor current $Ia^{rms}$=0 and approaches 0 with an increase in the detected value of motor current $Ia^{rms}$ as shown in FIG. 7. Here, it would be best to empirically select K1 in such a measure that the value of K1 is 1 for the detected value of motor current $Ia^{rms}$=0 and becomes 0 at least for the detected value $Ia^{rms}$ equal to the lock current Imax during the 100% duty driving time of the motor 1.

Further, Eq. (4), K1 and the detected value of motor current $Ia^{rms}$ are employed in calculating ω but the motor current target Ia* may be employed in place of the detected value of motor current $Ia^{rms}$ if the response of current control means 10 can be regarded as being speedy enough. Then, there is an advantage that the calculated ω is not affected by the noise contained in the detected value of motor current $Ia^{rms}$.

In this way, when determining a motor angular velocity estimate ω in accordance with the method of the present invention, the square wave component is removed from the motor-applied voltage in the motor-applied voltage detection circuit 5 and accordingly further software calculation becomes simple and the sampling frequency can be also set to a lower value. In addition, the offset of motor angular velocity estimate ω caused by an error in armature resistance Ra can also be simply and effectively removed.

The motor angular acceleration calculation means 12 calculates a motor angular acceleration estimate dω/dt from the motor angular velocity estimate ω calculated in motor angular velocity calculation means 11. This calculation procedure will be described referring to the flowchart of FIG. 9 and the block diagram of FIG. 10. Further the block diagram of FIG. 10 functionally represents the procedure of S92 to S94 out of the flowchart of FIG. 9.

First of all, the motor angular velocity estimate ω is read in S91 and the high pass filtering thereof on a predetermined cutoff frequency fc 1 is performed in S92. Next, the calculated result of S92 is multiplied by a gain K2 in S93, a low pass filtering of the result calculated in S93 is further performed at a predetermined cutoff frequency fc 2 and dω/dt is obtained in S94. Finally, dω/dt is stored into the RAM 8c in S95.

By these calculations, the frequency characteristic of FIG. 11 is obtained. That is, if fc 1 is set near the response frequency (e.g., 5 Hz) needed for the steering system, the differential characteristic of 20 dB/dec can be possessed in the frequency band where inertial feeling of the motor becomes a matter of concern. Furthermore, if fc 2 is set to cut off the unnecessary band (e.g., above 5 Hz) for the control of the steering system, it also becomes possible to suppress the noise of motor angular acceleration estimate dω/dt at the same time.

When there is no need to promote the gain in motor angular acceleration calculation means 12, the step S93 is unnecessary and the frequency characteristic of FIG. 12 is obtained when this step is omitted.

The Coulomb-friction compensating current calculation means 13 calculates a Coulomb-friction compensating current estimate Ic for compensating the Coulomb friction of the steering system and for improving the steering wheel returnability and the frictional feeling at low vehicle speed from the motor angular velocity estimate ω and the vehicle speed Vs. This calculation procedure will be described referring to the flowchart of FIG. 13 and to FIG. 14. First, the motor angular velocity estimate ω calculated as mentioned above is read and the vehicle speed Vs calculated in a predetermined method in S131. Then, a Coulomb-friction compensating current target Ic is determined from the motor angular velocity estimate ω and the vehicle speed Vs is determined in accordance with a predetermined table in S132. Finally, the aforesaid Coulomb-friction compensating current target Ic is stored into the RAM in S133.

A table for determining Ic is so arranged, for example as shown in FIG. 14, that current clipped to a definite value depending on the vehicle speed Vs passes in the same direction as with ω when the motor angular velocity estimate ω exceeds the a predetermined value ω1. Here, the clip value Ic 1 of current is set in such a manner that the steering system can generate a torque for compensating an increase in the Coulomb friction of the steering system caused by connection to the motor 1.

In this way, when the motor 1 is rotated by the steering of a driver or the self-aligning torque of a tire, a definite current flows in the rotational direction of the motor and thus an operation such as if the Coulomb friction of the steering system had been reduced becomes possible. In addition, an improvement in steering wheel return and frictional feeling becomes possible. Incidentally, the value Ic may be constant independently of the vehicle speed Vs, but if the table is arranged so that the value of current decreases with an increase in vehicle speed Vs as shown in FIG. 14, the worsening of convergence in steering wheel return at high vehicle speed described later can be prevented, the steering wheel return at low vehicle speed can be improved and further the feeling of steering can be enhanced.

Similarly, although the aforesaid threshold ω1 may also be constant independent of vehicle speed Vs but may be varied depending on the vehicle speed. For example, if ω1 is set to increase with an increase in vehicle Vs as shown in FIG. 14, the swinging of steering wheel at high vehicle speed can be prevented.

The viscous-friction compensating current calculation means 14 calculates a viscous-friction compensating current target Id for giving a viscous feeling to steering feel and enhancing the convergence of steering wheel return likely to worsen especially at high vehicle speed from the motor angular velocity estimate ω and the vehicle speed Vs. This procedure will be described by referring to the flowchart of FIG. 15 and to the characteristic drawing of FIG. 16.

First, the motor angular velocity estimate ω calculated as mentioned above and the vehicle speed Vs calculated in accordance with a predetermined method is read in S151. Then, a viscous-friction compensating current target Id is determined from the motor angular velocity estimate ω and the vehicle speed Vs in accordance with a predetermined table in S152. Finally, the aforesaid viscous-friction compensating current target Id is stored into the RAM 8c in S153.

A table for determining a viscous-friction compensating current target Id is so arranged, for example as shown in FIG. 16, that current proportional to the motor angular velocity estimate ω passes in the opposite direction to the motor angular velocity estimate ω. In this way, when the motor 1 is rotated by the steering of a driver or the self-aligning torque of a tire, the viscous-friction compensating current target Id proportional to the motor angular velocity estimate ω passes in the opposite direction to the rotational direction of the motor 1.

As a result, an operation such as if the viscous friction of the steering system had increased becomes possible. In addition to giving such a viscous feeling and reactive feeling as obtained in the hydraulic power steering to of steering feel, an improvement in steering wheel return at high vehicle speed becomes possible. Further, although the gain Id/ω may be constant independent of vehicle speed Vs, if the table is arranged that the aforesaid gain increases with an increase in vehicle speed Vs as shown in FIG. 16, the worsening of steering wheel return at low vehicle speed can be prevented. At middle and high vehicle speed, a solid feeling of steering accompanied by a viscous feeling and reactive feeling can be imparted to the steering system, the convergence of steering wheel return can be improved and the feeling of steering can be further enhanced.

The inertia compensating current calculation means 15 calculates an inertia compensating current target Ij effective in reducing the inertial feeling. This procedure will be described by referring to the flowchart of FIG. 17 and to the characteristic drawing of FIG. 18. First, the motor angular acceleration estimate dω/dt calculated as mentioned above is read and the vehicle speed Vs calculated in accordance with a predetermined method in S171. Then, an inertia compensating current target Ij from the motor angular velocity estimate ω and the vehicle speed Vs is determined in accordance with a predetermined table in S172. Finally, the inertia compensating current target Ij is stored into the RAM 8c in S173.

A table for determining an inertia compensating current target Ij is so arranged, for example as shown in FIG. 18, that current proportional to the motor angular acceleration estimate dω/dt passes in the direction of the motor angular acceleration estimate dω/dt. In this way, when the motor 1 rotates by the handling of a driver or the self-aligning torque of a tire, the inertia compensating current target Ij proportional to the motor angular acceleration estimate dω/dt passes in the acceleration direction of the motor 1. Accordingly, such an operation becomes possible as if the inertial moment of the steering system had decreased, and an worsening in the inertial feeling of the handling feeling due to connection of the motor 1 to the steering system can be prevented.

Figure 42:
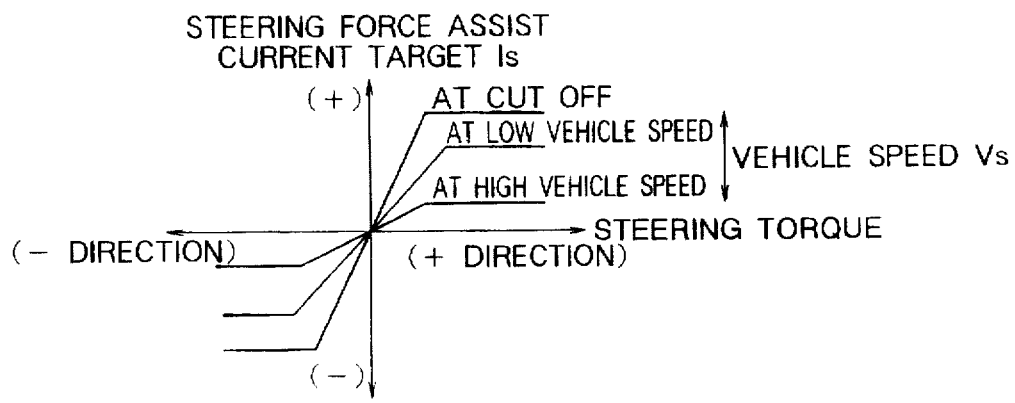
FIG. 42 is a graph illustrating the relation between the steering torque and the steering assist current for the present invention and a conventional control.
Figure 43:
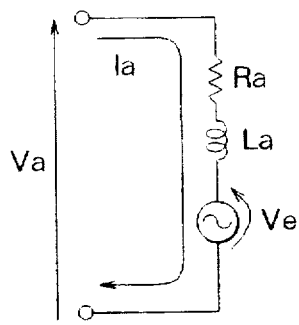
FIG. 43 is an equivalent circuit diagram of a DC motor armature.
Figure 44:
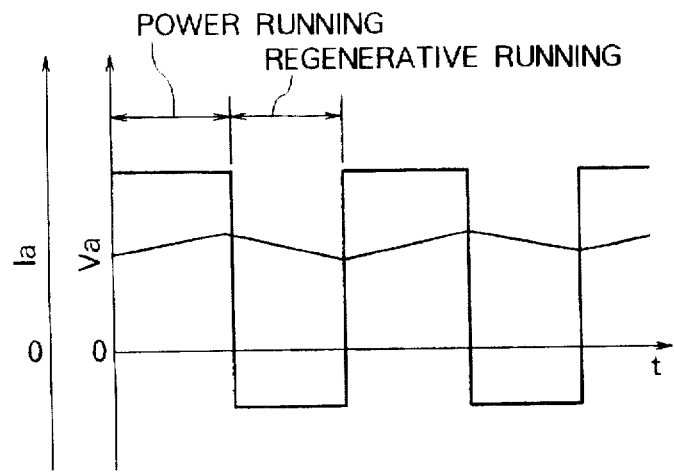
FIG. 44 is a waveform graph showing the relation between the motor-applied voltage and the motor current in the PWI drive of a DC motor.

Here, generally in steering force assist current calculation means 9, to provide a sure and solid steering hold force to a driver, the gain Is/Vt is decreased with an increase in vehicle speed Vs as shown in FIG. 42. Consequently, with an increase in vehicle speed Vs, the steering hold force increases but there occurs a bad effect that the response of the steering system worsens. Thus, the gain Ij/(dω/dt) may be constant independently of vehicle speed Vs but if the table is so arranged that the gain Ij/(dω/dt) increases with an increase in vehicle speed Vs as shown in FIG. 16, the above-mentioned worsening of response can be compensated, so that a sure and solid steering hold force can be provided to a driver without worsening the response with an increase in vehicle speed Vs.

In contrast, in a case where the convergence of steering wheel return at high vehicle speed worsens with an increase in the aforesaid gain, the table may be so arranged that the gain decreases with an increase in vehicle speed Vs.

The motor current target Ia* is determined by adding the Coulomb-friction compensating current target Ic, the viscous-friction compensating current target Id, the inertia compensating current target Ij and the steering force assist current target Is for statically assisting the steering torque together and the motor 1 is driven under such a feedback control by current control means 10 that this motor current target Ia* coincides with the detected value of motor current $Ia^{sns}$.

As described above, according to this embodiment, since an arrangement of estimating a motor angular velocity estimate ω from the motor-applied voltage detected by hardware is employed and the band pass characteristic is attached to the differential operation of estimating a motor angular acceleration dω/dt from the motor angular velocity estimate ω, the motor angular acceleration dω/dt and the motor angular velocity estimate • can be accurately calculated even for a lower sampling frequency and a more inexpensive CPU can be used in comparison with a conventional apparatus.

In addition, because of an arrangement for correcting the motor angular velocity estimate ω on the basis of the motor current Ia, the effect of the armature resistance Ra on the motor angular Velocity estimate • can be reduced in comparison with a conventional apparatus. Furthermore, because of an arrangement of compensating the Coulomb friction on the basis of the motor angular velocity estimate ω, the steering wheel returnability or the frictional feeling especially at low vehicle speed can be improved without increasing the cost in comparison with a conventional apparatus.

Embodiment 2

In the above embodiment 1, to suppress the effect of an error contained in the armature resistance Ra on the motor angular velocity estimate ω, the motor angular velocity estimate ω is clipped to 0 when a heavy current flows through the motor 1. However, considering that fast steering is impossible for a large steering torque, the motor angular velocity estimate ω may be clipped to 0 when the steering torque is large.

Figure 19:
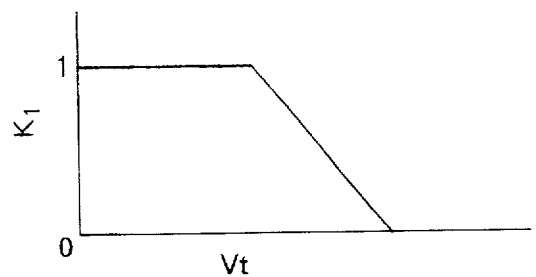
FIG. 19 is a graph illustrating the relation between the coefficient for correcting the motor angular velocity estimate and the steering torque in a control according to another embodiment of the present invention.

At that time, the motor angular velocity estimate ω may be set to 0 when the steering torque exceeds a predetermined threshold, but to evade a radical change in motor angular velocity estimate ω, the correction coefficient K1 may be determined from the steering torque Vt rather than from the motor current Ia as with Embodiment 1 as shown in FIG. 19.

Generally, the norm for an electrically-operated power steering controller is often given with an error for a maximum value of steering assist current target Is at each vehicle speed. Thus, although it may be felt that there would be problem for a large steering torque Vt so that the norm for an electrically-operated power steering controller cannot be satisfied on account of the offset of motor angular velocity estimate ω if current determined by statically adding the Coulomb-friction compensating current target Ic and the viscous-friction compensating current target Id based on the motor angular velocity estimate ω to the steering force assist current target Is flows through the motor 1. Embodiment 2 can surely prevent this problem

Embodiment 3

Figure 20:
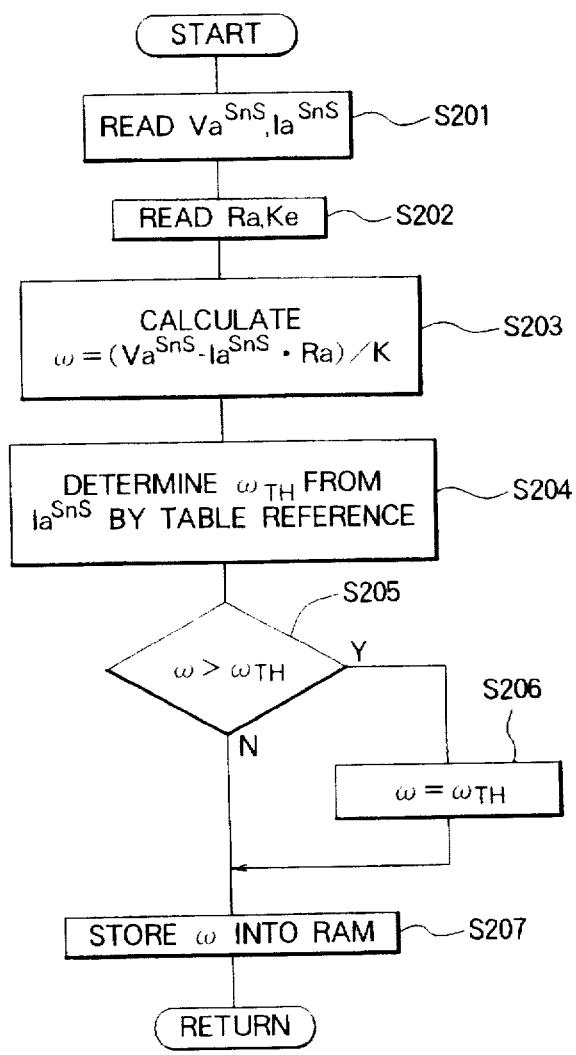
FIG. 20 is a flowchart illustrating a method for correcting the motor angular velocity estimate in a control according to a third embodiment of the present invention.
Figure 21:
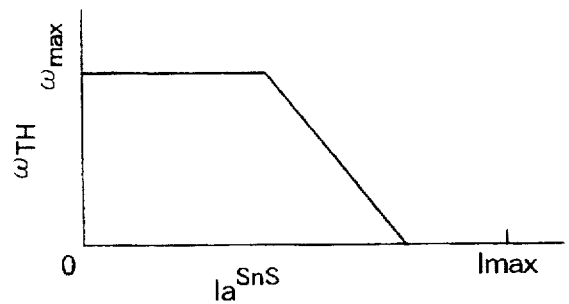
FIG. 21 is a graph illustrating the relation between the threshold for correcting the motor angular velocity estimate and the motor current in a control according to a third embodiment of the present invention.
Figure 22:
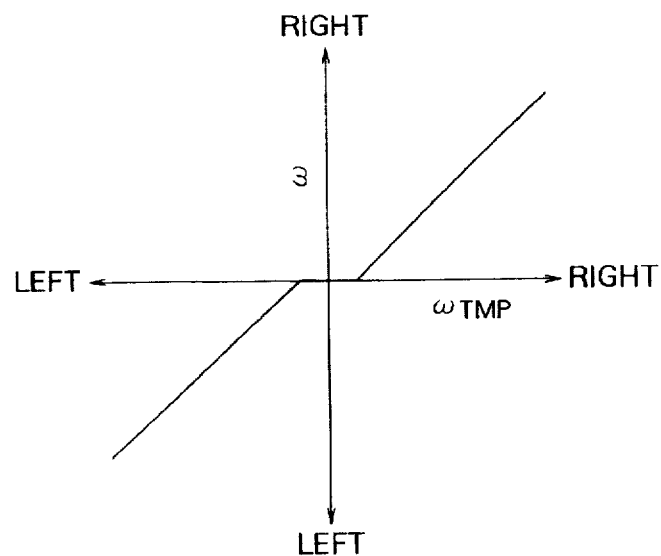
FIG. 22 is a flowchart illustrating a method for correcting the motor angular velocity estimate in a control according to a fourth embodiment of the present invention.

In Embodiments 1 and 2, to suppress the effect of an error contained in the armature resistance Ra on the motor angular velocity estimate ω, the motor angular velocity estimate ω determined in accordance with Eq. (4) is arranged to be multiplied by a correction coefficient K1 but may be arranged to be clipped below a predetermined threshold ωTH. FIG. 20 is a flowchart illustrating the operation of motor angular velocity calculation means 11 in Embodiment 3. FIG. 21 is to illustrate the aforesaid threshold ωTH.

Hereinafter, referring to the flowchart of FIG. 20, the operation of motor angular velocity calculation means 11 will be described. First, the A/D converted data of the detected value of motor-applied voltage $Va^{rns}$ is read and that of motor current $Ia^{rs}$ in S201, the constant data of armature resistance Ra is read and motor-induced voltage constant Ke is read from the ROM 8b in S202 and a motor angular velocity estimate ω is calculated in accordance with Eq. (4) in S203.

Next, in S204, referring to a predetermined table, the threshold ωTH is determined from the detected value of motor current $Ia^{rns}$ read in S201 and clip the motor angular velocity estimate ω determined in S205, S206 and S203 below the aforesaid threshold ωTH. Finally, in S207, store the obtained estimate ω in the RAM 8c.

Here, the $Ia^{rns}$ –ωTH table and TH will be described in detail. In calculating a motor angular velocity estimate ω in accordance with Eq. (4), an error in motor angular velocity estimate ω attributable to an error in armature resistance Ra is proportional to the motor current target Ia as shown by Eq. (5). Accordingly, it is thought that, if the motor angular velocity estimate ω determined from Eq. (4) is clipped below the threshold ω approaching to 0 with an increase in the detected value of motor current $Ia^{rns}$, the offset of motor angular velocity estimate ω for a large motor current target Ia can be removed.

Generally if the voltage applied to a motor is constant, however, there is a relation between the motor current Ia and the motor angular velocity μm when the motor angular velocity μm decreases with an increase in motor current Ia as shown in FIG. 8. Thus, it is advisable to empirically set K1 in such a measure that a value of threshold ωTH is greater than the motor angular velocity ωmax during the 100% duty driving time of an unloaded motor and becomes 0 at least for the detected value $Ia^{rns}$ equal to the lock current Imax.

Further, the motor current target Ia may also be employed in this embodiment in place of the detected value of motor current $Ia^{rns}$ if the response of current control means 10 is speedy enough. In addition, ωTH may be determined from the steering torque Vt rather than from the detected value of motor current $Ia^{rns}$ as with Embodiment 2.

Embodiment 4

Even if the offset of motor angular velocity estimate ω is corrected as with Embodiments 1 to 3, there are for a relatively small motor current target Ia cases where the effect of an error in armature resistance Ra appears on the calculated result of motor angular velocity estimate ω. However, since an error in motor angular velocity estimate ω attributable to an error in armature resistance Ra is proportional to the motor current target Ia as mentioned above, such an offset is considered to be relatively small (e.g., 2 to 3 bits). Thus, when the motor angular velocity estimate ω calculated as with Embodiments 1 to 3 ($=\omega_{TMP}$) is less than a predetermined threshold, the above problem is considered to be solvable by an arrangement of clipping ω to 0.

If a motor angular velocity estimate ω is calculated as with this embodiment, the offset of motor angular velocity estimate ω appearing for a relatively small motor current can be removed, thereby enabling the problem of the viscous-friction compensating current target Id becoming large due to the offset of motor angular velocity estimate ω and the frictional feeling increasing, especially at slight steering inputs to be solved.

Embodiment 5

Even if the offset of motor angular velocity estimate ω is corrected as in Embodiments 1 to 4, there are cases where no perfect correction is accomplished and the offset remains. In such cases, the motor angular velocity estimate ω calculated as with Embodiments 1 to 4 ($=\omega_{TMP}$) may be taken as motor angular velocity estimate ω after the high-pass filtering thereof at a predetermined cutoff frequency. In this way, the offset of motor angular velocity estimate ω can be completely removed.

Figure 23:
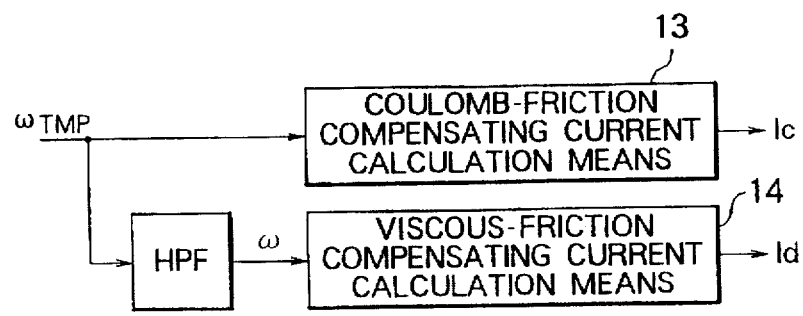
FIG. 23 is a block diagram illustrating the relation between means for correcting the motor angular velocity estimate and means for calculating the motor control current in a control according to a fifth embodiment of the present invention.

At this time, however, if a motor rotates at constant rate, the motor angular velocity estimate becomes ω=0 and therefore there is a fear that Coulomb friction may be insufficiently compensated even if the cutoff frequency is set low. Thus, especially when the Coulomb friction is a matter of concern, it may be arranged to give $\omega_{tmp}$ before high-pass filtering to Coulomb-friction compensating current calculation means 13 and to give the motor angular velocity estimate ω after high-pass filtering to viscous-friction compensating current calculation means 14 as shown in FIG. 23.

Embodiment 6

Figure 24:
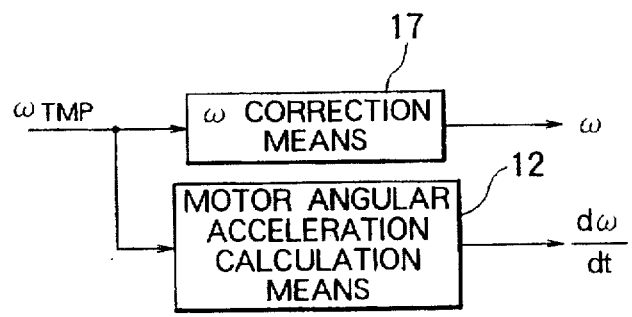
FIG. 24 is a block diagram illustrating the relation between means for correcting the motor angular velocity estimate and motor angular acceleration calculation means in a control according to a sixth embodiment of the present invention.

After the correction of motor angular velocity estimate ω in accordance with a method described in any of Embodiments 1 to 5, a motor angular acceleration estimate dω/dt may be calculated. However, since the offset of motor angular velocity estimate ω is removed by differentiation, it may be arranged to give the motor angular velocity estimate ω after correction in motor angular velocity calculation means 17 to Coulomb-friction compensating current calculation means 13 and viscous-friction compensating current calculation means 14 and to give the motor angular velocity estimate ω before correction to motor angular acceleration calculation means 12 as shown in FIG. 24. In this way, the motor angular acceleration estimate dω/dt is prevented from being badly affected by the correction of motor angular velocity estimate ω.

Embodiment 7

Figure 25A:
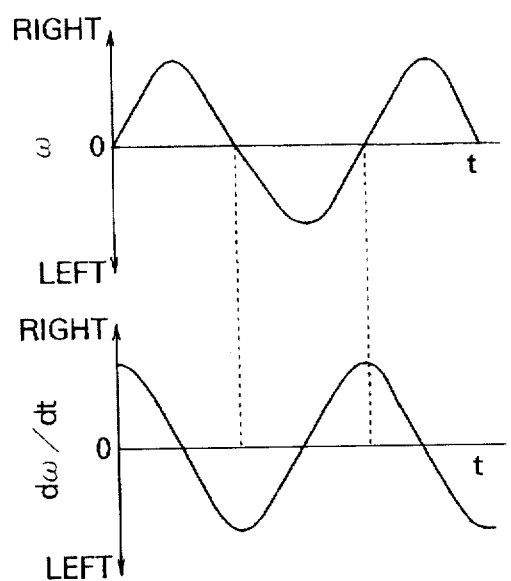
FIGS. 25(a) and 25(b) are a set of graphs illustrating the relation between means for correcting the motor angular velocity estimate and motor angular acceleration calculation means in a control according to a seventh embodiment of the present invention.
Figure 25B:
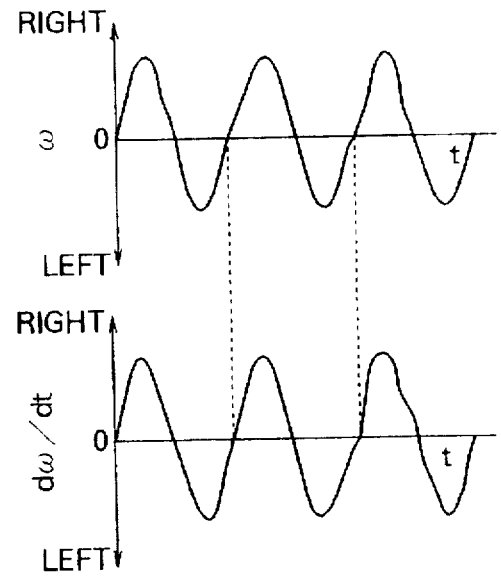

If the motor angular acceleration calculation means 12 is arranged to possess a band pass characteristic, there is no problem for a relatively low frequency of motor angular velocity ω m but with higher frequency, the phase of motor angular acceleration estimate dω/dt shifts and consequently the phase difference between the motor angular velocity estimate ω and the motor angular acceleration estimate dω/dt is forced to approach to 0. With a case of sine-wave steering taken as one example, FIGS. 25(a) and 25(b) illustrate the above problem.

If the frequency for the phase difference approaching 0 is sufficiently higher than the response frequency of the steering system (e.g., tens of Hz), this causes no trouble, whereas this causes troubles if the above frequency fc 2 has to be set low (e.g., 5 Hz) for such reasons as suppressing the noise in motor angular acceleration estimate dω/dt. For example, when the motor angular velocity estimate ω and the motor angular acceleration estimate dω/dt agree in phase difference, the viscous-friction compensating current target Id proportional to the motor angular velocity estimate ω and the inertia compensating current target Ij cancel each other, so that no compensating current flows.

Figure 26:
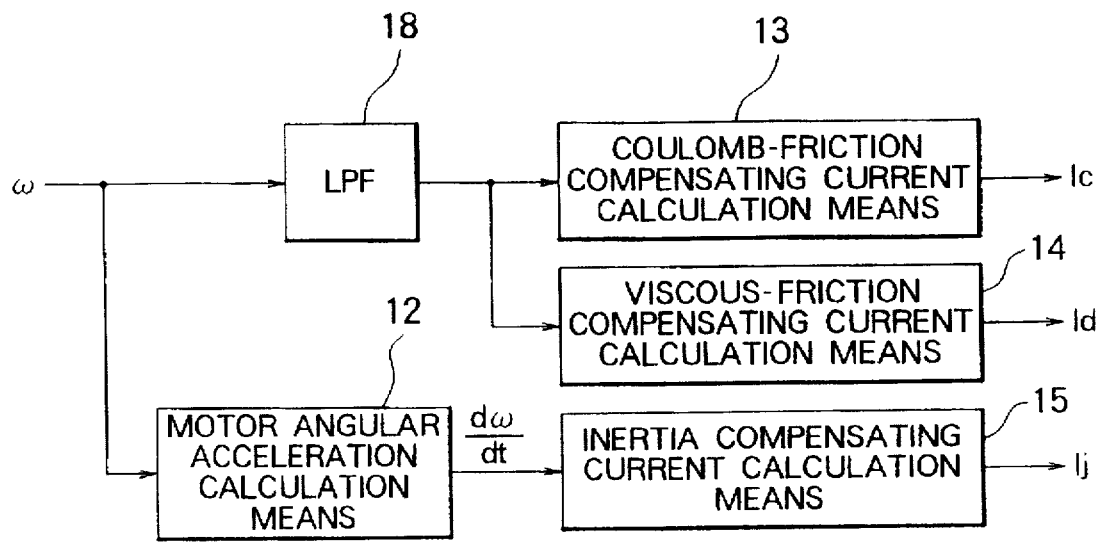
FIG. 26 is a block diagram illustrating the relation between means for correcting the motor angular velocity estimate and motor angular acceleration calculation means and means for calculating the motor control current in a control according to a seventh embodiment of the present invention.

For solving this problem, as shown in FIG. 26, it is only necessary to supply the motor angular velocity estimate ω determined as described in Embodiments 1 to 6 either to Coulomb-friction compensating current calculation means 13 or viscous-friction compensating current calculation means 14 after retarding the phase by further low-pass filtering. It is advisable to set the cutoff frequency of the above low-pass filter at a frequency where the phase difference between the motor angular velocity estimate ω and the motor angular acceleration estimate dω/dt becomes an issue, for example, at much the same frequency as fc2 above. In this way, the motor angular velocity estimate ω and the motor angular acceleration estimate dω/dt can be prevented from agreeing in phase difference and the phase relation between individual compensating currents can be maintained normally.

Embodiment 8

Figure 27:
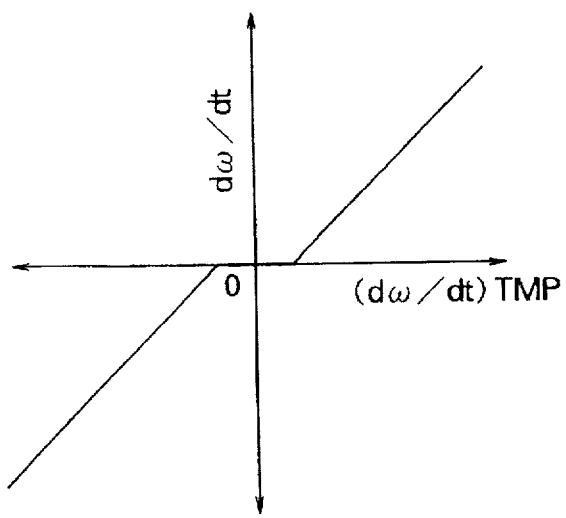
FIG. 27 is a graph illustrating a method for correcting the motor angular acceleration estimate in a control according to an eighth embodiment of the present invention.

When an unnecessary frequency component is contained in the motor angular velocity estimate ω due to noise contained in the detected value of motor current $Ia^{rms}$, there are cases where noise appears also on the motor angular acceleration estimate dω/dt and cannot be removed even by a change in the frequency characteristic of motor angular acceleration calculation means 12. In such cases, the above problem is considered to be solvable on the condition that ω is arranged to be clipped to 0 when the motor angular acceleration estimate dω/dt (=(dω/dt)$_{THP}$) calculated as in Embodiment 1 is below a predetermined threshold as shown in FIG. 27.

If the motor angular acceleration is calculated as in this embodiment, a noise component unable to be removed due to the high-band cutoff characteristic of motor angular acceleration calculation means 12 can be removed and such problems as vibration in the steering wheel near the neutral position can be solved.

Embodiment 9

Figure 28:
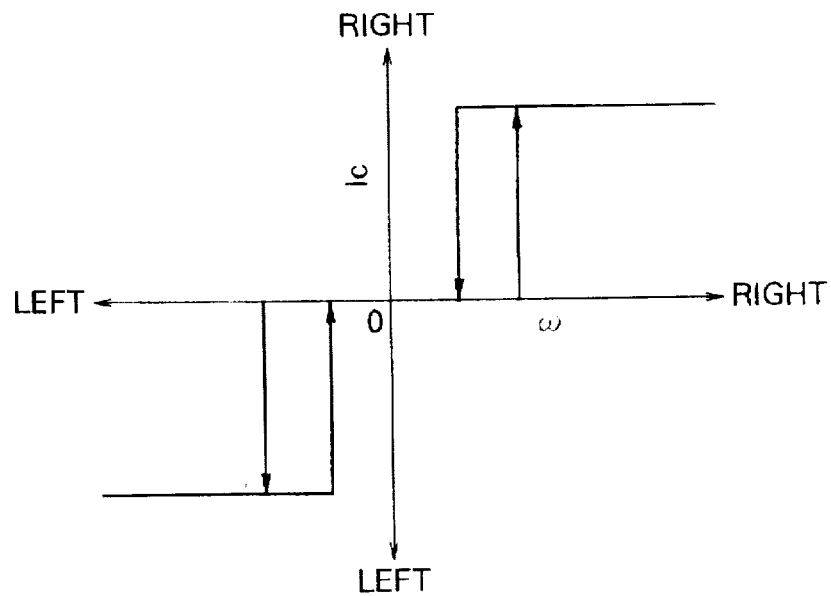
FIG. 28 is a graph illustrating the relation between the motor angular velocity estimate and the Coulomb-friction compensating current in a control according to a ninth embodiment of the present invention.

Embodiment 1 was so arranged that the current Ic clipped to a definite value depending on the vehicle speed Vs flows through in the same direction as the motor angular velocity estimate ω when the motor angular velocity estimate ω exceeds a predetermined value ω1. Here, on considering that noise is contained in the motor angular velocity estimate ω, an erroneous operation seems less likely to occur for a greater ω1. However, for a greater ω1, the Coulomb friction of the steering system is not sufficiently compensated and there would occur such problems that the steering wheel cannot completely return to the neutral position especially at low vehicle speed. In such cases, it is advisable to attach a hysteresis to the threshold el as shown in FIG. 28.

If the Coulomb-friction compensating current target Ic is calculated as with this embodiment, the noise component of motor angular velocity estimate ω can be prevented from affecting Ic without worsening the steering wheel return at low vehicle speed.

Embodiment 10

In Embodiment 1, the current Ic clipped to a definite value depending on the vehicle speed Vs is arranged to flow through in the same direction as with the motor angular velocity estimate ω when the motor angular velocity estimate ω exceeds a predetermined value ω1, but the gain Ic/ω may be changed depending on the vehicle speed Vs and the motor angular velocity estimate ω.

Figure 29:
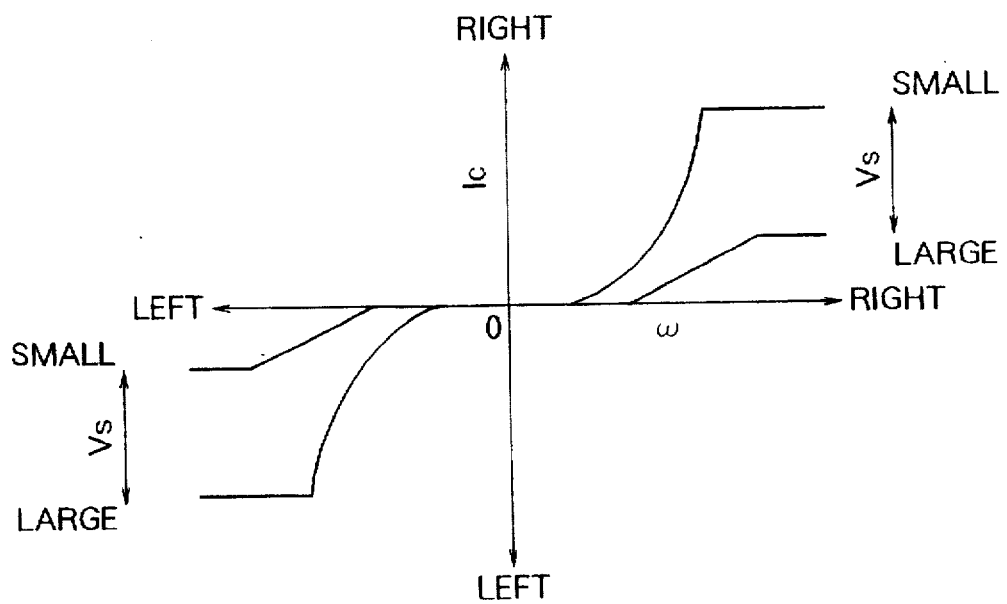
FIG. 29 is a graph illustrating the relation between the motor angular velocity estimate and the Coulomb-friction compensating current in a control according to a tenth embodiment of the present invention.
Figure 30:
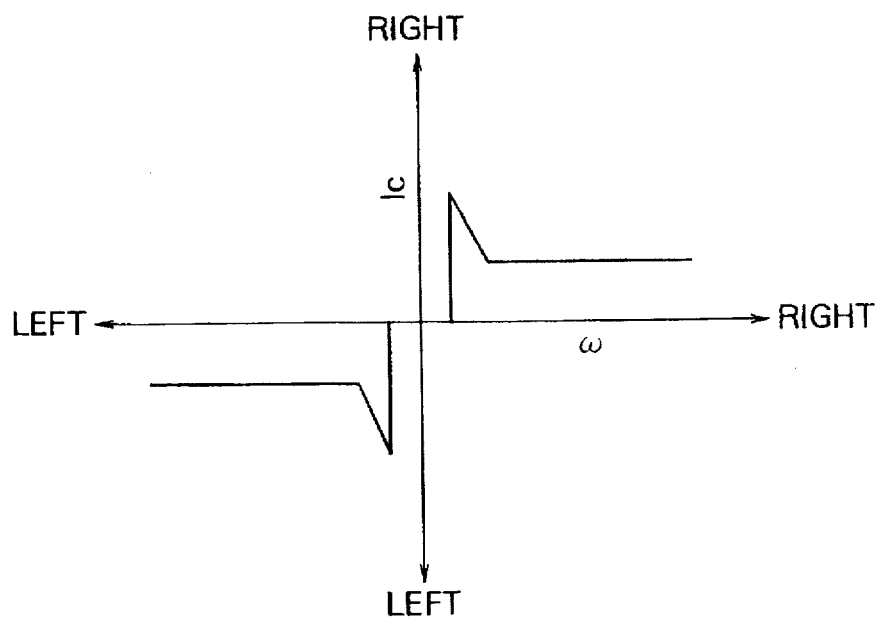
FIG. 30 is another graph illustrating the relation between the motor angular velocity estimate and the Coulomb-friction compensating current in a control according to a tenth embodiment of the present invention.

For example, as shown in FIG. 29, if Ic near ω=0 is set to smoothly rise at a predetermined gain relative to the motor angular velocity estimate ω, a radical change in motor current target near the neutral steering wheel position can be prevented and such problems as vibration of a steering wheel can be also prevented. In addition, for example, as shown in FIG. 30, if Ic near ω=0 is set to increase, the effect of static friction in the steering system can be alleviated to some extent.

Embodiment 11

In Embodiment 1, the Coulomb friction in the steering system is arranged to be compensated depending on the motor angular velocity estimate ω. In other words, unless the motor begins to rotate, no current for compensating the friction flows and the static friction is not compensated. Accordingly, some drivers have felt unnaturalness in steering wheel return, especially at low vehicle speed. In the present invention, the static friction cannot be completely compensated because no means for detecting the steering angle is provided, but if static- friction compensating current is arranged to be calculated depending on the differential value of the motor angular velocity estimate ω, the effect of static friction can be alleviated.

Figure 31:
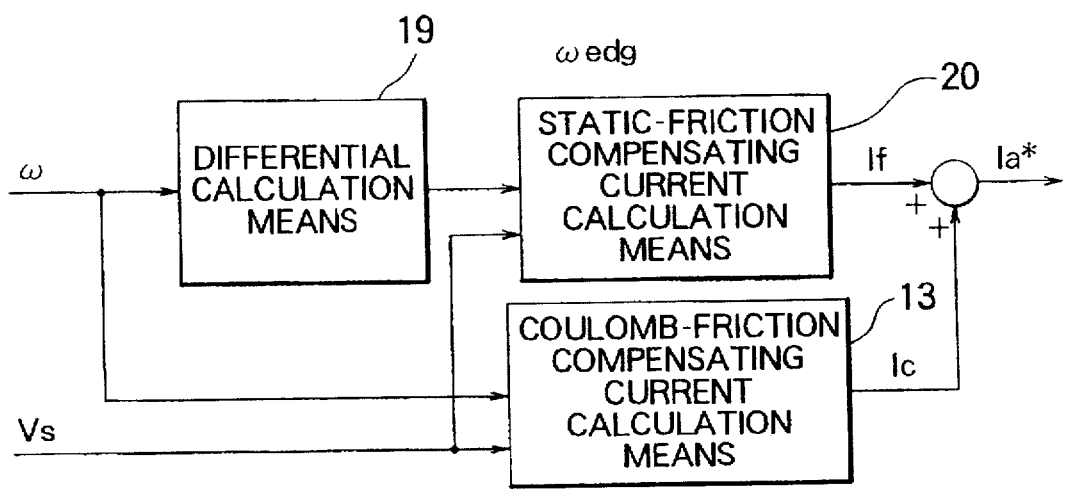
FIG. 31 is a block diagram illustrating a method for compensating the static friction in a control according to an eleventh embodiment of the present invention.
Figure 32:
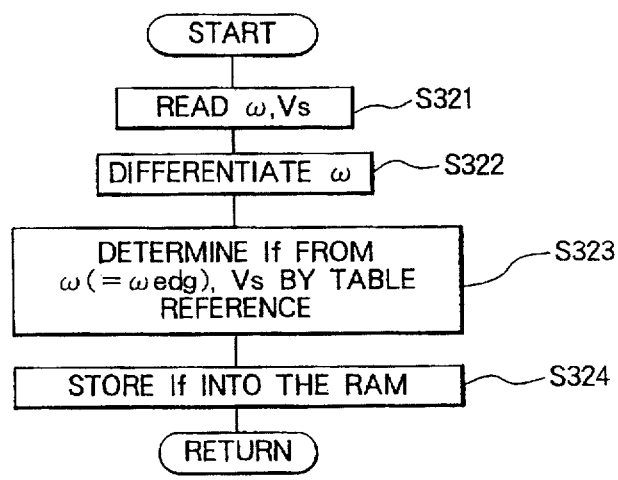
FIG. 32 is a flowchart illustrating a method for compensating the static friction in a control according to an eleventh embodiment of the present invention.

FIG. 31 is a block diagram representation of static friction compensation in this embodiment. FIG. 32 is a flowchart illustrating the operation of software. First, the motor angular velocity estimate ω and the vehicle speed Vs is read in S321. Then, differentiate the motor angular velocity estimate ω in differential calculation means 19 and extract the rising edge in S322. Here, $\omega_{edg}$ is the differentiated motor angular velocity estimate ω. Finally, the static-friction compensating current target If is determined from $\omega_{edg}$ and Vs in accordance with a predetermined table of static-friction compensating current calculating means 20 in S323 and the static-friction compensating current target If is stored into the RAM 8c in S324.

Figure 33:
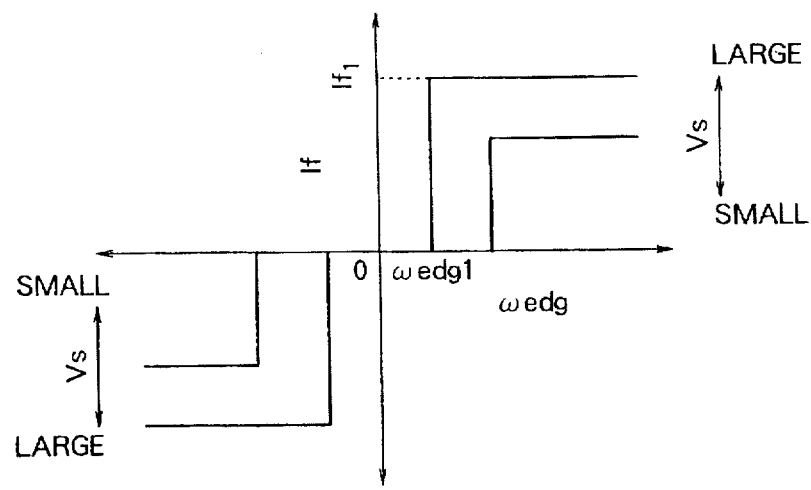
FIG. 33 is a graph illustrating the relation between the differential value of motor angular velocity estimate and the static friction compensating current in a control according to an eleventh embodiment of the present invention.

A table for determining the static-friction compensating current target If is arranged, for example as shown in FIG. 33, so that current clipped to a definite value depending on the vehicle speed Vs flows through in the same direction as with $\omega_{edge}$ when $\omega_{edg}$ exceeds a predetermined value $\omega_{edgel}$. Here, the clip value of current Ifl is set in such a manner that torque can be generated for compensating statistical friction of the steering system increased by connection to the motor.

In this way, when the motor 1 is rotated by the steering of a driver or the self-aligning torque of a tire, current flows for a short period in the rotational direction of the motor 1 and thus an operation such as if the static friction of the steering system had been reduced becomes possible, so that there is a further improvement in steering wheel returnability and feeling of friction over that of Embodiment 1.

Further, although the static-friction compensating current target If may be constant independent of vehicle speed Vs but, if the table is arranged that a value of current decreases with an increase in vehicle speed Vs as shown in FIG. 33, the worsening of convergence in steering wheel return at high vehicle speed can be prevented, the steering wheel returnability at low vehicle speed can be improved and the steering feel can be further enhanced.

Similarly, the aforesaid threshold $\omega_{edg1}$ may also be constant independent of vehicle speed Vs but may be changed depending on the vehicle speed. For example, if $\omega_{edg1}$ is set to increase with an increase in vehicle Vs as shown in FIG. 33, the vibration of the steering wheel at high vehicle speed can be prevented.

As shown in FIG. 31, the motor current target Ia* is calculated by adding the static-friction compensating current target If determined in this manner to the Coulomb-friction compensating current target Ic determined from the motor angular velocity estimate $\omega$ and the vehicle speed Vs in Coulomb-friction compensating current calculation means 13. Then, the motor 1 is controlled after a subsequent procedure similar to that of Embodiment 11.

Figure 34:
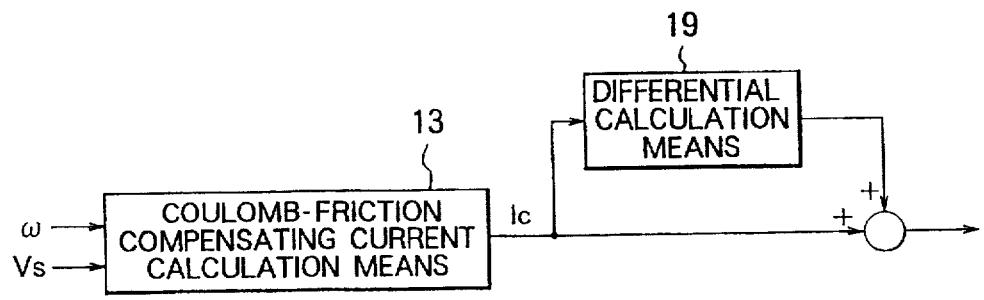
FIG. 34 is a block diagram illustrating another method for compensating the static friction in a control according to an eleventh embodiment of the present invention.

Further, although in this embodiment, the static-friction compensating current target If is calculated on the basis of $\omega_{edg}$ it is needless to say that a similar advantage can be obtained, for example as shown in FIG. 34, if the edge obtained by processing the Coulomb-friction compensating current target Ic in differential calculation means 19 is arranged to be enhanced.

In this way, this embodiment is so arranged that current flows through the motor 1 in response to the rising edge of the motor angular velocity estimate $\omega$ and therefore compensating the static friction of the steering system increased by connecting the motor 1 to the steering system becomes possible, so that a better steering feel than that of Embodiment 1 can be obtained.

Embodiment 12

In Embodiment 1, the viscous-friction compensating current target Id proportional to the motor angular velocity estimate $\omega$ is arranged to flow in a direction opposite to that of motor angular velocity estimate $\omega$ but the gain Id/$\omega$ may be changed depending on the vehicle speed Vs and the motor angular velocity estimate $\omega$.

Figure 35:
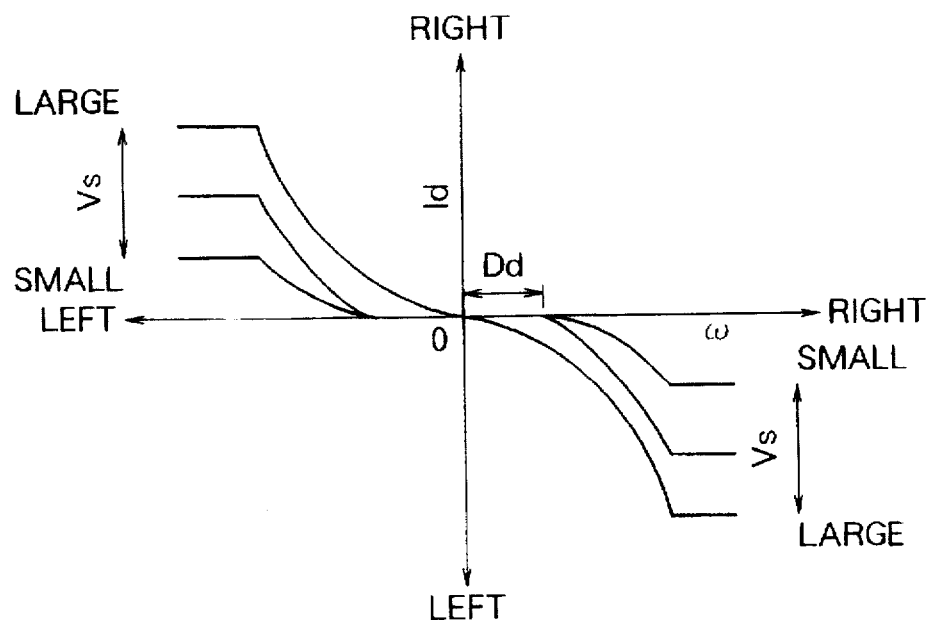
FIG. 35 is a graph illustrating the relation between the motor angular velocity estimate and the viscous-friction compensating current in a control according to a twelfth embodiment of the present invention.

For example, as shown in FIG. 35, if the viscous-friction compensating current target Id near $\omega$=0 is set to smoothly rise at a predetermined gain relative to the motor angular velocity estimate $\omega$, the viscous-friction compensating current target Id near the steering wheel neutral can be reduced and the viscous-friction compensating current target Id at emergency steering can be increased in comparison with Embodiment 1. As a result, the worsening of frictional feeling can be prevented, a sure reactive feeling and frictional feeling are provided during emergency steering and further an improvement in the convergence of handle return at high vehicle speed becomes possible.

If the table is so arranged that the above gain increases and the insensible zone Dd to the motor angular acceleration $d\omega/dt$ in the motor angular velocity estimate $\omega$ decreases with an increase in vehicle speed, the worsening of steering wheel return and frictional feeling at middle and low vehicle speed can be prevented and moreover an improvement in frictional feeling and convergence at high vehicle speed becomes possible, so that steering feel is further upgraded.

Embodiment 13

In Embodiment 1, the inertia compensating current target Ij proportional to the motor angular acceleration estimate $d\omega/dt$ is arranged to flow in the direction of motor angular acceleration estimate $d\omega/dt$ but the gain Ij/($d\omega/dt$) may be changed depending on the vehicle speed Vs and the motor angular velocity estimate $\omega$.

Figure 36:
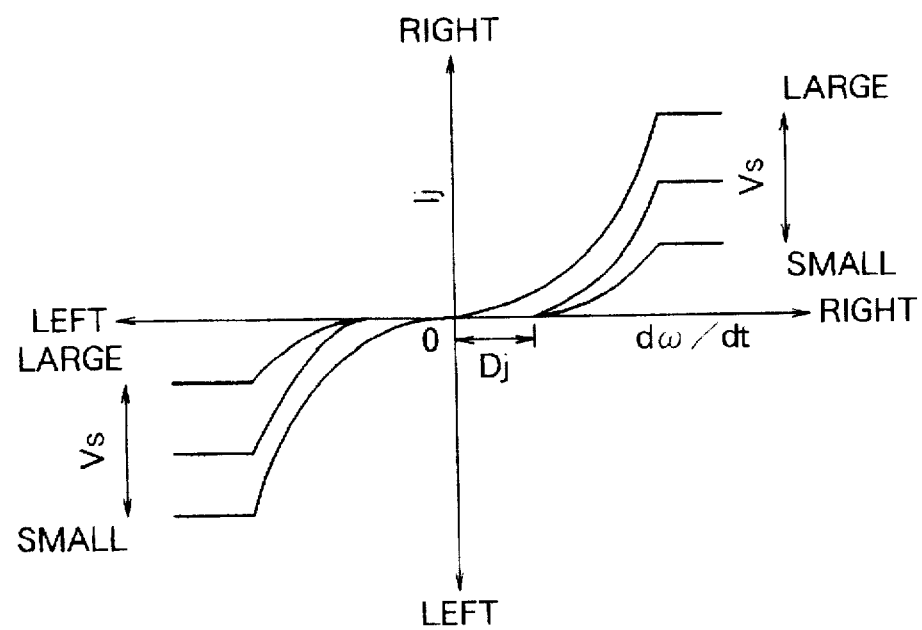
FIG. 36 is a graph illustrating the relation between the motor angular acceleration estimate and the viscous-friction compensating current in a control according to a thirteenth embodiment of the present invention.

For example, as shown in FIG. 36, if the inertia compensating current target Ij near $d\omega/dt$=0 is set to smoothly rise at a predetermined gain relative to the motor angular acceleration estimate $d\omega/dt$, the inertia compensating current target Ij near the steering wheel neutral can be reduced and the inertia compensating current target Ij during emergency steering can be increased in comparison with Embodiment 1. As a result, the vibration of a steering wheel near the steering wheel neutral can be prevented and the inertial feeling during emergency steering can be improved.

If the table is so arranged that the above gain increases and the insensible zone Dj to the motor angular acceleration $d\omega/dt$ in the inertia compensating current target Ij decreases with an increase in vehicle speed, the vibration of a steering wheel near the steering wheel neutral can be prevented at middle and low vehicle speed and an inertial feeling can be improved at middle and high vehicle speed, so that steering feel is further upgraded.

In a case where the convergence of steering wheel return at high vehicle speed worsens or the steering wheel vibrates near the steering wheel neutral with an increase in the aforesaid gain, on the contrary, the table may be so arranged that the gain decreases and the insensible zone increases with an increase in vehicle speed.

Embodiment 14

Embodiment 1 is arranged to detect the motor-applied voltage by using a differential amplifier and input it via the A/D convertor 8f to the CPU 8a, but an arrangement to input each terminal voltage to the A/D convertor 8f and calculate the motor-applied voltage in the CPU 8a is also allowable.

Figure 37:
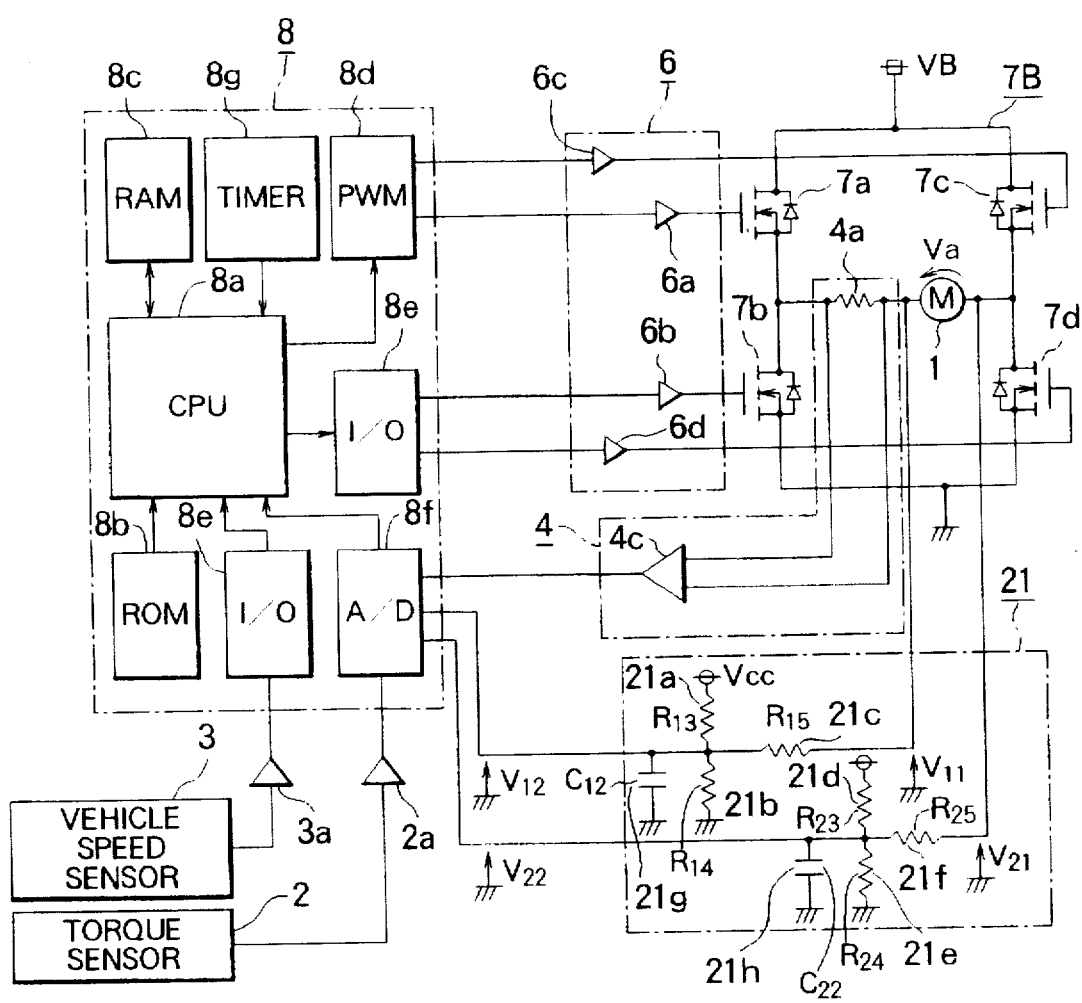
FIG. 37 is a hardware block diagram of a control according to a fourteenth embodiment of the present invention.

FIG. 37 is a hardware block diagram of a controller in this embodiment. Like symbols are attached to parts similar or equivalent to those of Embodiment 1. The motor current detection circuit 4 is arranged to convert the current flowing through the motor 1 into a predetermined voltage, to input it to the A/D convertor 8f described later. Further, the motor current detection circuit 4 is constructed to voltage-amplify the voltage between both ends of the voltage detecting resistor 4a connected in series to the motor 1 by using the amplification circuit 4c.

The motor terminal voltage detection circuit 21, having a predetermined low-pass character wherein the cutoff frequency is lower than the PWM carrier frequency driving the motor 1, serves to convert the terminal voltage Va of the motor 1 to a predetermined voltage level and to input it to the A/D convertor 8f. Resistors 21a to 21f and capacitors 21g to 21h determine the filter constant. Incidentally, parts other than those mentioned above are the same as with Embodiment 1 and the description thereof will be omitted.

Figure 38:
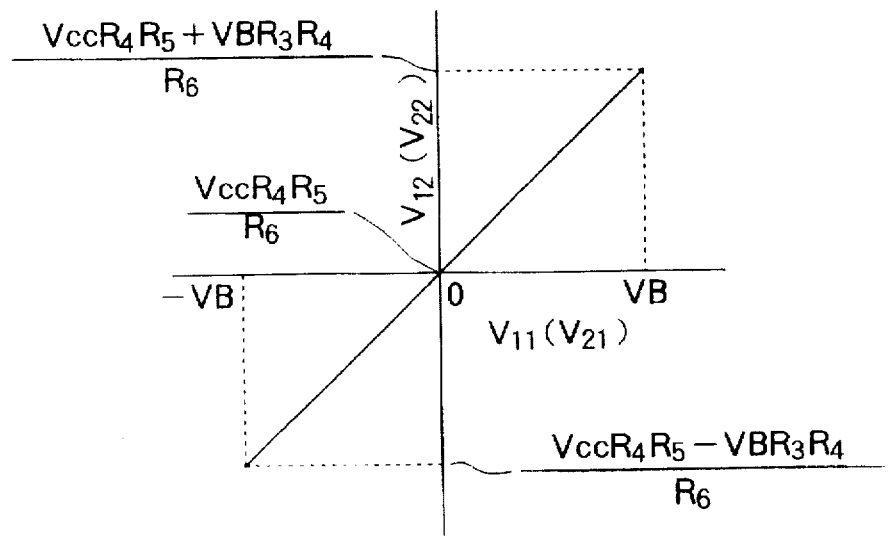
FIG. 38 is a graph showing the DC characteristic of a motor terminal voltage detection circuit in a control according to a fourteenth embodiment of the present invention.
Figure 39:
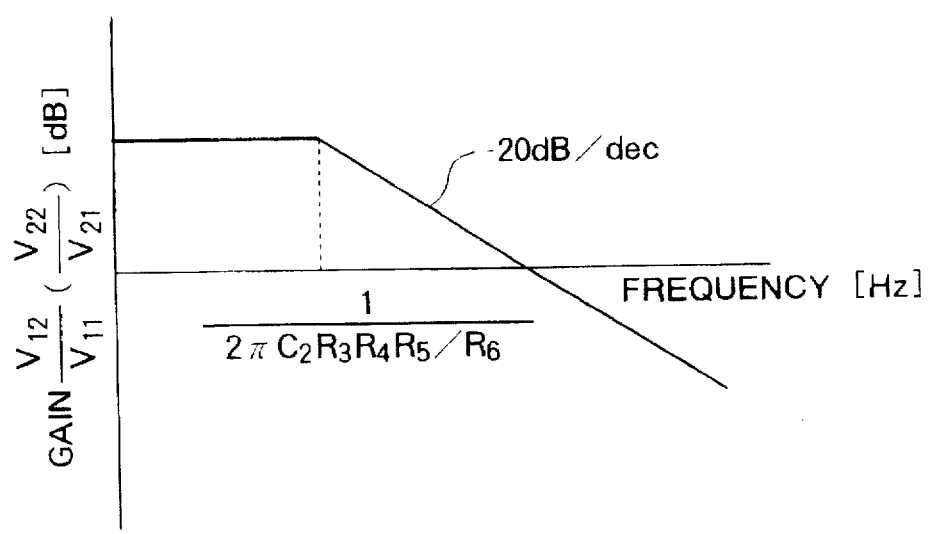
FIG. 39 is a graph showing the frequency characteristic of a motor terminal voltage detection circuit in a control according to a fourteenth embodiment of the present invention.

FIGS. 38 and 39 show the DC characteristic and the frequency characteristic of the motor terminal voltage detection circuit 21, respectively.

Figure 40:
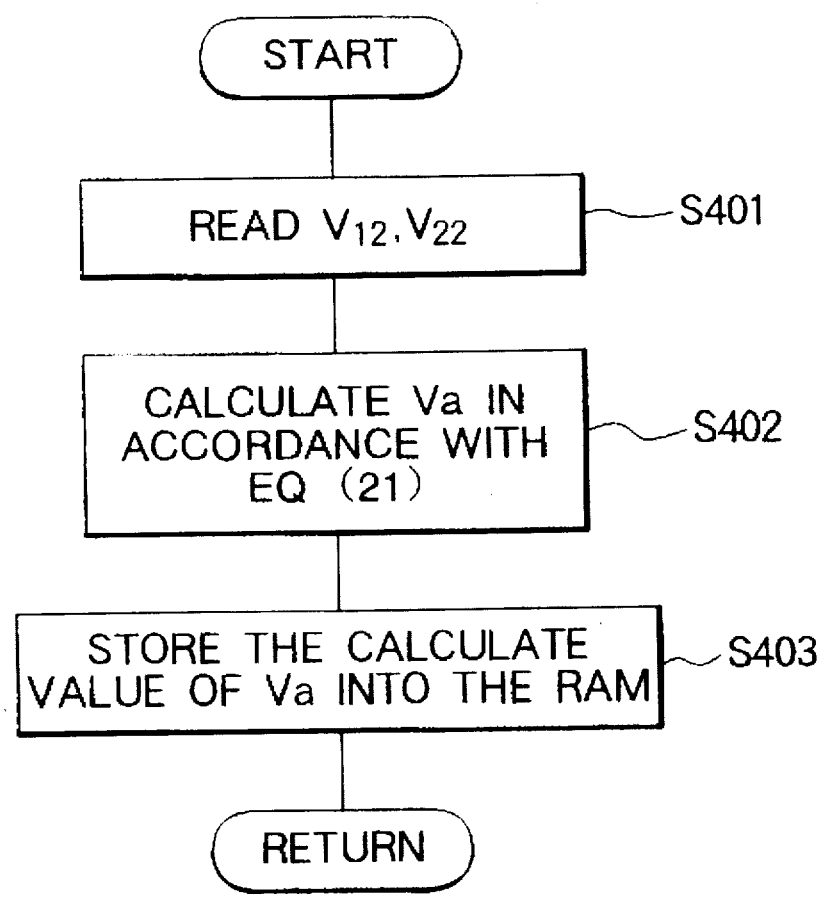
FIG. 40 is a flowchart illustrating a method for calculating the motor-applied voltage in a control according to a fourteenth embodiment of the present invention.

FIG. 40 is a flowchart illustrating the operation of software for calculating the motor-applied voltage from the motor terminal voltage.

Here, the motor terminal voltage detection circuit 21 will be described in detail. In FIG. 37, setting the circuit constants as follows:

$R13=R23=R3$ $$R14=R24=R4 \tag{12}$$

$$R15=R25=R5 \tag{13}$$

$$C12=C22=C2 \tag{14}$$

the relations between V11 and V12 as well as between V21 and V22 of detected motor terminal voltage values in the s-region (s: Laplace's operator) are expressed as in the following Eqs. (15) and (16):

$$V12=Vcc \cdot R4 \cdot R5/R6+V11 \cdot R3 \cdot R4/R6/(1+C2 \cdot R3 \cdot R4 \cdot R5 \cdot s/R6) \tag{15}$$

and $$V22=Vcc \cdot R4 \cdot R5/R6+V11 \cdot R3 \cdot R4/R6/(1+C2 \cdot R3 \cdot R4R5 \cdot s/R6) \tag{16}$$

where $$R6=R3 \cdot R4+R4 \cdot R5+R5 \cdot R3 \tag{17}$$

Eqs. (15) and (16) reveal that V12 and V22 are voltages obtained by dividing V11 and V21 by R3·R4/R6, respectively, attaching the first order retardation characteristic of a time constant C2·R3·R4·R5/R6 to it and adding it to the DC bias voltage Vcc·R4·R5/R6. That is, the DC characteristic and the frequency characteristic are obtained as shown in FIGS. 38 and 39, respectively.

In Eqs. (15) and (16), letting Vcc be a constant voltage (e.g., 5V), resistors R3, R4 and R5 are set in such a manner that the volt rage (e.g., −12 to 12V) of V11 and V21 is level-changed into the input volt range (e.g., 0 to 5V) of the A/D converter 8f.

Since V11 and V21 also turn into square waves as with the motor-applied voltage Va, capacitor C2 is set in such a manner that the cutoff frequency fc=1/(2π·C2·R3·R4·R5/R6) is sufficiently lower than the PWM carrier frequency (e.g., 20 kHz) and sufficiently higher than the motor response frequency (e.g., some one hundred Hz). In this way, a band wide allowing the control of the steering system is secured and the detected motor terminal voltage values V12 and V22, from which the respective square wave components of V11 and V21 have been removed, can be input to the A/D convertor 8f.

Next, a method for calculating the motor-applied voltage Va from V11 and V12 will be described. On applying the final value theorem to Eqs. (15) and (16), V12 and V22 are expressed on the DC scheme in the following Eqs. (18) and (19), respectively:

$$V12=Vcc \cdot R4 \cdot R5/R6+V11 \cdot R3 \cdot R4/R6 \tag{18}$$

and $$V22=Vcc \cdot R4 \cdot R5/R6+V21 \cdot R3 \cdot R4/R6 \tag{19}$$

Seeing that in FIG. 37

$$Va=V11-V21 \tag{20}$$

the motor-applied voltage Va is determined from the following Eq. (21) by substituting Eqs. (18) and (19) into Eq. (20):

$$Va=(V12-V22) \cdot R6/(R3 \cdot R4) \tag{21}$$

That is, it is only necessary to calculate the motor-applied voltage Va from the detected motor terminal voltage values V12 and V22 in the CPU 8a based on Eq. (21).

Furthermore, the operation of software to determine the motor-applied voltage Va from the detected motor terminal voltage values V12 and V22 will be described along the flowchart of FIG. 40. First, the A/D converted data of detected motor terminal voltage values V12 and V22 is read in S401. Then, a motor-applied voltage Va is calculated in accordance with Eq. (21) in S402. Finally, the calculated value of motor-applied voltage Va is stored into RAM 8c in S403.

Thereafter, it is advisable to calculate a motor angular velocity estimate ω and a motor angular acceleration estimate dω/dt by using the motor-applied voltage Va calculated in this manner and to control the motor 1 as with Embodiment 1. As described above, according to this embodiment, a high speed CPU need not be used and the OP amplifier can be omitted in contrast to Embodiment 1 because of the arrangement when the motor terminal voltage, from which the square wave component attendant on the PWM drive of the motor has been removed, is detected by using hardware and the motor-applied voltage is calculated by using software.

Furthermore, in the motor-applied voltage detection circuit 5 of Embodiment 1, since the common mode of motor terminal voltage is removed by using the OP amplifier 5j, although a failure state when each terminal voltage of the motor changes at the same phase, e.g., when a motor line is grounded by when power MOSFET's 7a to 7d are OFF, cannot be detected, by using the motor terminal voltage detection circuit 21 enables each terminal voltage of the motor can be monitored in CPU 8a, so that detecting the above-mentioned failure becomes possible and the capability to detect a failure is advanced.

In using the motor-applied voltage detection circuit 5 for detecting a failure of the motor, it is preferred to install a current detecting resistor 4a on the power supply side for promoting the capability to detect a failure as with Embodiment 1. However, using the motor terminal voltage detection circuit 21 of this embodiment will enable the current detecting resistor 4a to be connected in series to the motor and the sample hold circuit 4b to be omitted, so that cost-saving become possible.

What is claimed is:

1. An electric power steering apparatus, comprising:
  a) a motor connected to a steering system;
  b) PWM control means for driving and controlling said motor on the basis of a PWM control signal;
  c) motor-applied voltage detection means having a low pass characteristic for converting the detected voltage applied to said motor to a predetermined level after removing a PWM carrier frequency component therefrom with the aid of the low pass characteristic and outputting the resultant voltage, wherein the cutoff frequency of the low pass characteristic is set to be below the PWM carrier frequency contained in said control signal;
  d) angular velocity estimation means for estimating the angular velocity of said motor on the basis of the outputted resultant voltage; and
  e) current value calculation means for calculating a current target of said motor on the basis of the estimated angular velocity.

2. The electric power steering apparatus as set forth in claim 1 wherein
  the motor angular velocity estimate is clipped below a predetermined value in accordance with a current through said motor.

3. The electric power steering apparatus as set forth in claim 2 wherein
   the motor angular velocity estimate is positively fed back to the steering control system and, in accordance with the positive feedback, the motor current is clipped below a predetermined value based on a friction of the steering system.

4. The electric power steering apparatus as set forth in claim 3 wherein
   in clipping the motor angular velocity estimate in accordance with the positive feedback of the motor angular velocity estimate, one of the motor current value and the positive feedback gain of motor angular velocity is changed depending on at least one of said motor angular velocity estimate and a vehicle speed.

5. The electric power steering apparatus as set forth in claim 3, further comprising
   differentiation means for increasing the motor current in accordance with the positive feedback of the motor angular velocity estimate at the rising time is provided.

6. The electric power steering apparatus as set forth in claim 2 wherein
   steering control based on the angular velocity is performed by a negative feedback of the motor angular velocity estimate.

7. The electric power steering apparatus as set forth in claim 6 wherein
   a negative feedback gain of said motor angular velocity estimate is changed depending on at least one of said motor angular velocity estimate and a vehicle speed.

8. The electric power steering apparatus as set forth in claim 1 wherein
   the motor angular velocity estimate is clipped below a predetermined value in accordance with a steering torque.

9. The electric power steering apparatus as set forth in claim 1 wherein
   the motor angular velocity estimate is clipped to 0 if calculated motor angular acceleration is below a predetermined value.

10. The electric power steering apparatus as set forth in claim 1 wherein
    the motor angular velocity estimate is subjected to a high pass filtering if said PWM carrier frequency is above a predetermined frequency.

11. The electric power steering apparatus as set forth in claim 1 wherein
    a motor angular acceleration is estimated by differentiating the motor angular velocity estimate.

12. The electric power steering apparatus as set forth in claim 11 wherein
    the differentiation processing has a band pass characteristic.

13. The electric power steering apparatus as set forth in claim 12 wherein
    the motor angular velocity estimate is subjected to a low pass filtering having a cutoff frequency nearly equal to a high range cutoff frequency of the band pass characteristics at the time of differentiation processing.

14. The electric power steering apparatus as set forth in claim 11 wherein
    the motor angular acceleration estimate is clipped to 0 if the calculated result thereof is below a predetermined value.

15. The electric power steering apparatus as set forth in claim 11 wherein:
    steering control based on said motor angular acceleration is performed by a positive feedback of said angular acceleration estimate.

16. The electric power steering apparatus as set forth in claim 15 wherein
    a positive feedback gain of said angular acceleration estimate is changed depending on at least one of said angular acceleration estimate and a vehicle speed.

17. An electric power steering apparatus, comprising:
    a) a motor connected to a steering system;
    b) PWM control means for driving and controlling said motor on the basis of a PWM control signal;
    c) motor terminal voltage detection means having a low pass characteristic for converting the detected terminal voltage of said motor to a predetermined level after removing a PWM carrier frequency component therefrom with the aid of the low pass characteristic and outputting the resultant voltage, wherein the cutoff frequency of the low pass characteristic is set to be below the PWM carrier frequency contained in said control signal;
    d) angular velocity estimation means for estimating the angular velocity of said motor on the basis of the outputted resultant voltage; and
    e) current value calculation means for calculating a current target of said motor on the basis of the estimated angular velocity.

* * * * *